(12) United States Patent
Mantiuk et al.

(10) Patent No.: US 8,330,768 B2
(45) Date of Patent: Dec. 11, 2012

(54) APPARATUS AND METHOD FOR RENDERING HIGH DYNAMIC RANGE IMAGES FOR STANDARD DYNAMIC RANGE DISPLAY

(75) Inventors: Rafal Mantiuk, Saarbruecken (DE); Scott James Daly, Kalama, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1536 days.

(21) Appl. No.: 11/829,739

(22) Filed: Jul. 27, 2007

(65) Prior Publication Data

US 2009/0027558 A1    Jan. 29, 2009

(51) Int. Cl.
*G09G 5/02* (2006.01)
(52) U.S. Cl. ........................................................ 345/589
(58) Field of Classification Search .................... None
See application file for complete search history.

(56) References Cited

U.S. PATENT DOCUMENTS

| | | | |
|---|---|---|---|
| 7,068,396 B1 | 6/2006 | Gallagher et al. | |
| 7,071,947 B1 | 7/2006 | Papakipos et al. | |
| 7,102,682 B2 | 9/2006 | Baer | |
| 7,113,649 B2 | 9/2006 | Gindele | |
| 7,116,838 B2 | 10/2006 | Gindele et al. | |
| 7,127,122 B2 | 10/2006 | Ogata et al. | |
| 7,130,485 B2 | 10/2006 | Gindele et al. | |
| 7,136,073 B2 | 11/2006 | Newman | |
| 7,136,076 B2 | 11/2006 | Evanicky et al. | |
| 7,142,704 B2 | 11/2006 | Hara | |
| 7,146,059 B1 | 12/2006 | Durand et al. | |
| 7,663,640 B2 * | 2/2010 | Nayar et al. | 345/589 |
| 7,853,076 B2 * | 12/2010 | Le Meur et al. | 382/166 |
| 2006/0119613 A1 * | 6/2006 | Kerofsky | 345/590 |

FOREIGN PATENT DOCUMENTS

| | | |
|---|---|---|
| EP | 0 732 669 B1 | 1/2003 |
| EP | 1 168 243 B1 | 6/2004 |
| EP | 1 453 030 A1 | 9/2004 |

OTHER PUBLICATIONS

Kao, Chen, and Wang, "Tone Reproduction in Color Imaging Systems by Histogram Equalization of Macro Edges", 2006 IEEE Tenth International Symposium on Consumer Electronics, pp. 1-6.*

(Continued)

*Primary Examiner* — Kee M Tung
*Assistant Examiner* — Haixia Du
(74) *Attorney, Agent, or Firm* — Michael Blaine Brooks, PC; Pejman Yedidsion; David Ripma

(57) ABSTRACT

The method, system and apparatus embodiments of the present invention provide for rendering original images having high dynamic range into display images having lower dynamic range while retaining a visual quality of rendered images comparable to the original or reference images. Tone-mapping parameters are applied to the display images and are iteratively adjusted in order to reduce the differences between the conditioned original image and the conditioned display image.

25 Claims, 18 Drawing Sheets

OTHER PUBLICATIONS

Fattal,R.,Lischinski,D., and Werman,M.,"Gradient Domain High Dynamic Range Compression,"2002, School of Computer Science and Engineering, Hebrew University of Jerusalem.

Durand, F. and Dorsey, J. "Fast Bilateral Filtering for the Display of High-Dynamic-Range Images,"2002, Laboratory for Computer Science, Massachusetts Institute of Technology.

Larson,G., Rushmeier, and Piatko, C.,"A Visibility Matching Tone Reproduction Operator for High Dynamic Range Scenes,"IEEE Transactions, Oct.-Dec. 1997, vol. 3, No. 4, pp. 291-306.

Reinhard,Stark,Shirley & Ferwerda"Photographic Tone Reproduction for Digital Images"2002, Retrieved from the Internet Apr. 10, 2007:<URL:www.graphics.cornell.edu/~jaf/publications>.

Pattanaik,Tumblin,Yee&Greenberg"Time-Dependent Visual Adaptation for Fast Realistic Image Display"Retrieved via Internet Apr. 10, 2007<URL:www.cs.ucf.edu/~sumant/publications>.

Pattanaik et al."A Multiscale Model of Adaptation and Spatial Vision for Realistic Image Display"Retrieved by Internet Apr. 10, 2007 <URL:www.graphics.cornell.edu/~jaf/publications.

\* cited by examiner

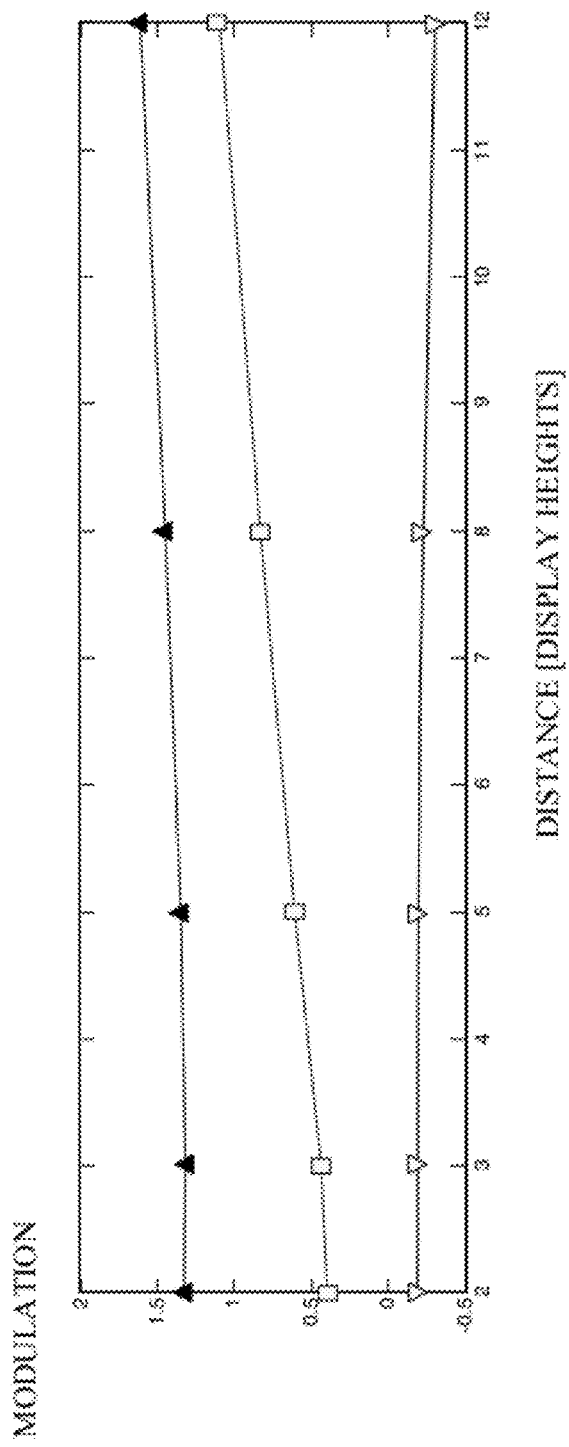
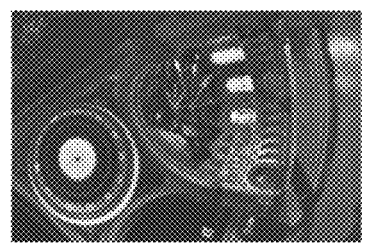
FIG. 16C
FIG. 16A
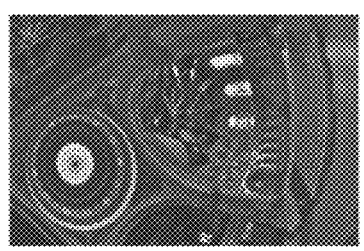
FIG. 16B

APPARATUS AND METHOD FOR RENDERING HIGH DYNAMIC RANGE IMAGES FOR STANDARD DYNAMIC RANGE DISPLAY

FIELD OF THE INVENTION

The embodiments of the present invention relate to apparatuses and methods of rendering high dynamic range images for standard dynamic range display, particularly renderings using visual models, display models, and the tuning of parameters to achieve perceptually acceptable renderings at dynamic ranges lower than the dynamic ranges of the source images.

BACKGROUND

A principal goal of a tone-mapping problem is to reproduce a scene on a display so that the displayed image is visually perceived to be an acceptably close or is a completely faithful reproduction of the original image. An identical, or perfect, match between the original image and its rendering on a display or in a hard-copy format is almost never practicable. The impracticability may be attributed in part to an output medium that is typically insufficiently bright in the face of ambient light and may be unable to display the image with a dynamic range, i.e. contrast, and color gamut, that faithfully represents the source image. Often the rendering on a perceptually acceptable output device becomes a trade-off between preserving certain image features at the cost of a degradation of others image features. For example, high contrast and brightness of an image can be often preserved only at the cost of incurring clipping, i.e., the saturating of certain amount of pixels in bright or in dark regions. The determination of those features deemed more important than others for faithful rendering may be driven by particular applications, and for a particular application, a metric may be applied, based on some aspects of the visual perception, to drive the resulting display image perceptually close to the original image.

SUMMARY

The invention, in its several embodiments includes methods, systems and apparatuses for rendering original images having high dynamic range into display images having lower dynamic range while retaining a visual quality of rendered images comparable to the original or reference images. Tone-mapping parameters are applied to the display images and are iteratively adjusted in order to reduce the differences between the conditioned original image and the conditioned display image. An exemplary method of image rendering of the present invention includes the steps of: (a) modifying a reference image luminance based on a luminance perception model as part of a human visual system model; (b) shaping or filtering the spatial frequency transform of the modified display image with a contrast sensitivity function and generating a reference response image; (c) modifying a display image luminance based on an input luminance and a brightness parameter, a sharpness parameter, and a contrast parameter; (d) optionally modifying a display image chrominance based on a white light bias parameter; (e) if, on a pixel-by-pixel basis, a display image color radiance component exceeds a display-limited range, then optionally limiting, on a pixel-by-pixel basis, the display image color radiance component to the exceeded display-limited range value; (f) modifying a display image luminance based on the luminance perception model of the human visual system model; (g) optionally shaping or filtering a spatial frequency transform of the modified display image with the contrast sensitivity function and thereafter generating a display response image; (h) comparing the display response image with the reference response image to generate an error value; (i) if the error value exceeds a threshold value; then modifying at least one of: the brightness parameter, the sharpness parameter, the contrast parameter, and optionally the white light bias; and (j) repeating steps (c)-(i) while the error value exceeds the threshold value. In some process or method embodiments, the contrast sensitivity function may be a function of viewing distance. In some method embodiments, the human visual response model comprises, as a human luminance perception model, a just-noticeable-difference (JND) encoding function. In some method embodiments, the error value may be generated via a mean square error (MSE) process and in some embodiments, a process iteration test threshold may be based on either a minimal MSE value and/or a determination that the maximal pixel difference between the display response image and the reference response image is below a preset threshold.

An exemplary system embodiment of the present invention includes: a first display image luminance processing module having a processing unit, and addressable memory, the processing module adapted to modify a display image luminance based on an input luminance and a brightness parameter, a sharpness parameter, and a contrast parameter; a second display image luminance processing module adapted to modify a display image luminance based on a human luminance perception model as part of the human visual system model; a shaping or filtering module adapted to shape the spatial frequency response of the modified display image with a contrast sensitivity function and adapted to generate a display response image; a comparator module adapted to generate the error value based on the generated display visual response image and a reference visual response image; and a parameter processing module having a processing unit, and addressable memory adapted to modify at least one of: the brightness parameter, the sharpness parameter, the contrast parameter, and, optionally, a white light bias; wherein the parameter modification is based on the generated error value. One of ordinary skill in the art will appreciate that functionality may be distributed across or within different modules of various system embodiments and still fall within the contemplated scope of the invention. The exemplary system embodiment may further include a display processing module having a processing unit, and addressable memory wherein the display processing module is adapted to modify a display image chrominance based on a white light bias parameter. The display processing module of the exemplary system embodiment may be further adapted to limit, on a pixel-by-pixel basis, when a display image color radiance component exceeds a display-limited range, then limiting, on a pixel-by-pixel basis, the display image color radiance component to the exceeded display-limited range value. The exemplary system embodiment may further include a reference visual image processing module having a processing unit, and addressable memory wherein the reference image processing module is adapted to modify a reference image luminance based on the human luminance perception model of the human visual system model and shaping or filtering the modified display image spatial frequency transform with a contrast sensitivity function and generate a reference visual response image.

An exemplary apparatus embodiment of the present invention may include a processing module having a processing unit, and addressable memory wherein the processing module tests on whether a generated error value is less than a threshold value and wherein the processing module is adapted to: modify a display image luminance based on an input luminance and a brightness parameter, a sharpness parameter, and a contrast parameter; modify a display image luminance based on a human luminance perceptual model as part of a human visual system model; shape or filter the spatial frequency transform of the modified display image with the contrast sensitivity function and generate a display visual response image; compare the generated display visual response image with a reference visual response image to generate the error value; and modify at least one of: the brightness parameter, the sharpness parameter, the contrast parameter, and the white light bias; when the generated error value is above a threshold value. The processing module of the exemplary apparatus may be further adapted to modify a display image chrominance based on a white light bias parameter, and limit, on a pixel-by-pixel basis, when a display image color radiance component exceeds a display-limited range, then limiting, on a pixel-by-pixel basis, the display image color radiance component to the exceeded display-limited range value. The processing module of the exemplary apparatus may be further adapted to modify a reference image luminance based on the human luminance perception model as a portion of the human visual system model and shape or filter the spatial frequency transform of the modified display image with a contrast sensitivity function and generate a reference visual response image.

BRIEF DESCRIPTION OF THE DRAWINGS

The present invention is illustrated by way of example and not limitation in the figures of the accompanying drawings, and in which:

FIG. 16A is an exemplary graph of a resulting brightness, contrast, and sharpness tone mapping parameters as functions display distance, normalized by display height;

FIG. 16B is a sample image at twice the display height;

FIG. 16C is a sample image at twelve times the display height;

DETAILED DESCRIPTION

Figure 1:
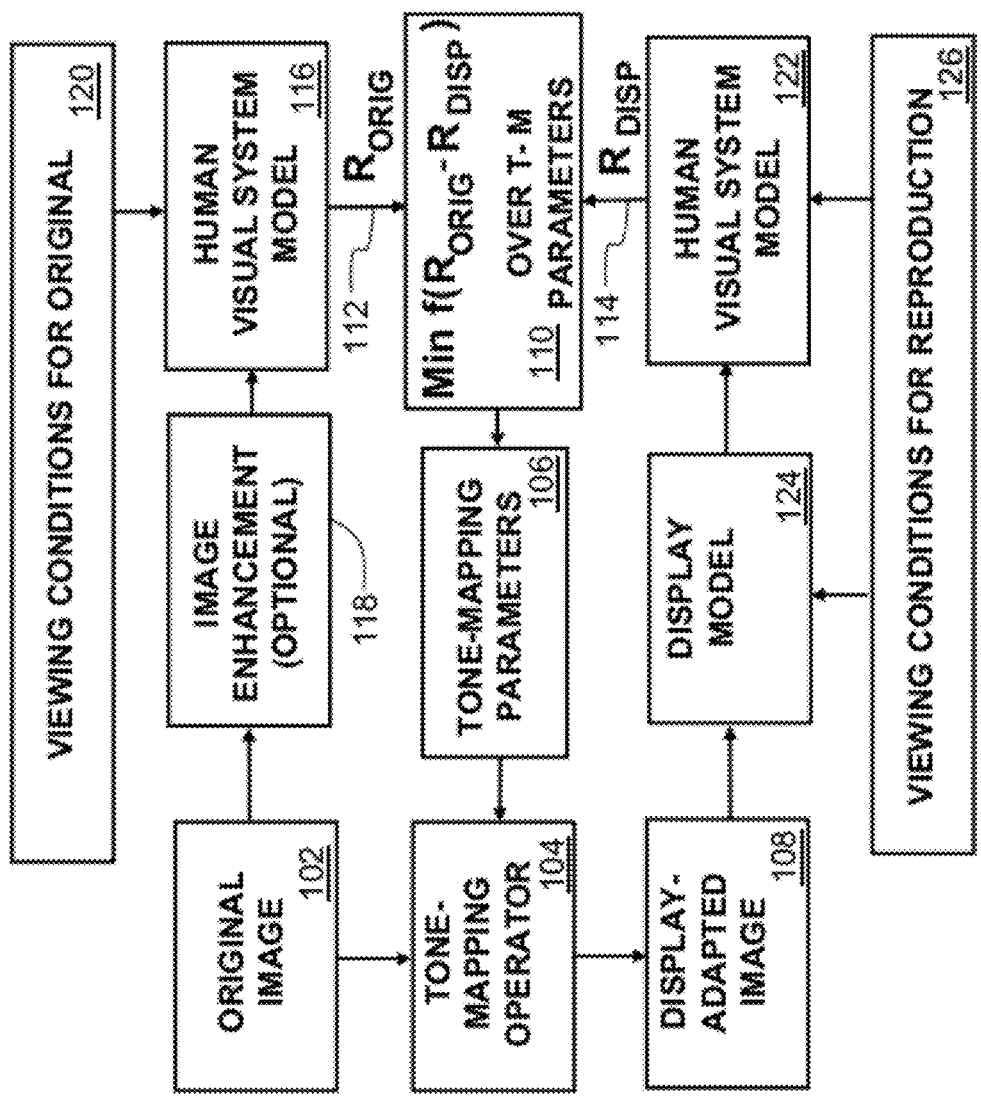
FIG. 1 is an exemplary top-level functional block diagram of a process embodiment of the present invention.

When the dynamic range, i.e., contrast ratio, or color gamut of an original image exceeds the capacity of the target display device intended to be used to reproduce a faithful image, processing techniques may be applied to generate an image as perceptually faithful an image as practicable within the constraints of the display device itself. Some display methods map the image code value to the achievable range of the display by applying a tone curve. Such a tone curve in application is rarely adapted to adjust for image content or viewing conditions. For an example as to viewing conditions, there may be no adjustments in the applied tone curve for the effect of changes in ambient light level. Accordingly, more faithful reproductions in a displayed image may be achieved where the rendering method adapts to the viewing conditions, display capabilities of the target display and image content.

The present invention, in its several embodiments, adaptively renders an image of an arbitrary dynamic range and a wide color gamut onto a specified display device, that is, a rendering made under the constraints of the capabilities and capacity of the display device, where rendering with limited display capabilities can mean rendering within the available range of white and black level and the color gamut. That is, the present invention, in its several embodiments, renders an image via the target display device that, when compared to existing methods, has a reduced humanly perceptible visual difference between the rendered and the original images.

Method embodiments of the present invention take, as an input, a high quality—preferably high dynamic range—image and data on viewing conditions (e.g., distance from the display screen, ambient light level, and surround) and produces as a result a display-adapted image. The display-adapted image is, for purposes of the selected objective function, the result of an iteratively optimized rendering of the input image under given display conditions and constraints of the target display, particularly constraints such as maximum brightness and contrast range. Exemplary system embodiments of the present invention, by which a display-adapted image may be iteratively rendered according to a selected portion of the human visual system, may be comprised of two or more processing modules, or network nodes, wherein each node or processing module has computing functionality, e.g., a general or special microprocessor, and an addressable memory. One of ordinary skill in the art will appreciate that functionality may be distributed across or within different modules of various system embodiments and still fall within the contemplated scope of the invention. In addition, exemplary apparatus embodiments of the present invention, having at least one processing module and addressable memory, may execute steps of the disclosed method embodiments and in doing so iteratively render a display-adapted image according to a selected portion of the human visual system.

Having an original image as input, which can be in high dynamic range (HDR) or any high quality format, an iterative goal may be to generate a display-adapted image that would appear to a human viewer to be a faithful rendering of a reference original image. A response image, $R_{disp}$, of the human visual system for an image shown on the display device may not be exactly the same as a response image, $R_{orig}$, evoked by the original or reference scene due to differences in viewing conditions between the two images and to such limitations in the display device as a limited dynamic range and color gamut. For purposes of illustration, one may presume that the iterative goal of nearly faithful reproduction is practicably achieved if the response of the human visual system for an image shown on the display, $R_{disp}$, is made practicably close to the response of the human visual system evoked by the original or reference scene, $R_{orig}$. Tone mapping parameters may be adjusted to modify the rendered image on the display device and the direction of their adjustments may be driven in directions to reduce the difference between $R_{orig}$ and $R_{disp}$ in an iterative fashion.

Referring to FIG. 1, what may be termed an original image 102, having a high dynamic range, may be operated on by a tone-mapping operator 104, having tone-mapping parameters 106 and thereby render a display-adapted image 108. Embodiments of the present invention, via an error minimizing process 110, iteratively adjust the tone-mapping parameters 106 from their initial values in directions that also reduce the difference between a response of the original image 112, $R_{ORIG}$, and a response of the display-adapted image 114, $R_{DISP}$. In order to generate the representation of the original image 112, $R_{ORIG}$, a human visual system model 116 may be applied that takes in the original image 102 that may be optionally enhanced 118 and may incorporate viewing conditions, e.g., viewing distance, of the original image 120 to produce the response of the original image 112. In order to generate the response of the display-adapted image 114, $R_{DISP}$, a human visual system model 122 may be applied that takes in the display-adapted image 108 after it is conditioned by a display model 124 and may incorporate viewing conditions 126, the viewing conditions of the display-adapted image 108, to produce the response of the display-adapted image 114, $R_{DISP}$.

Figure 2:
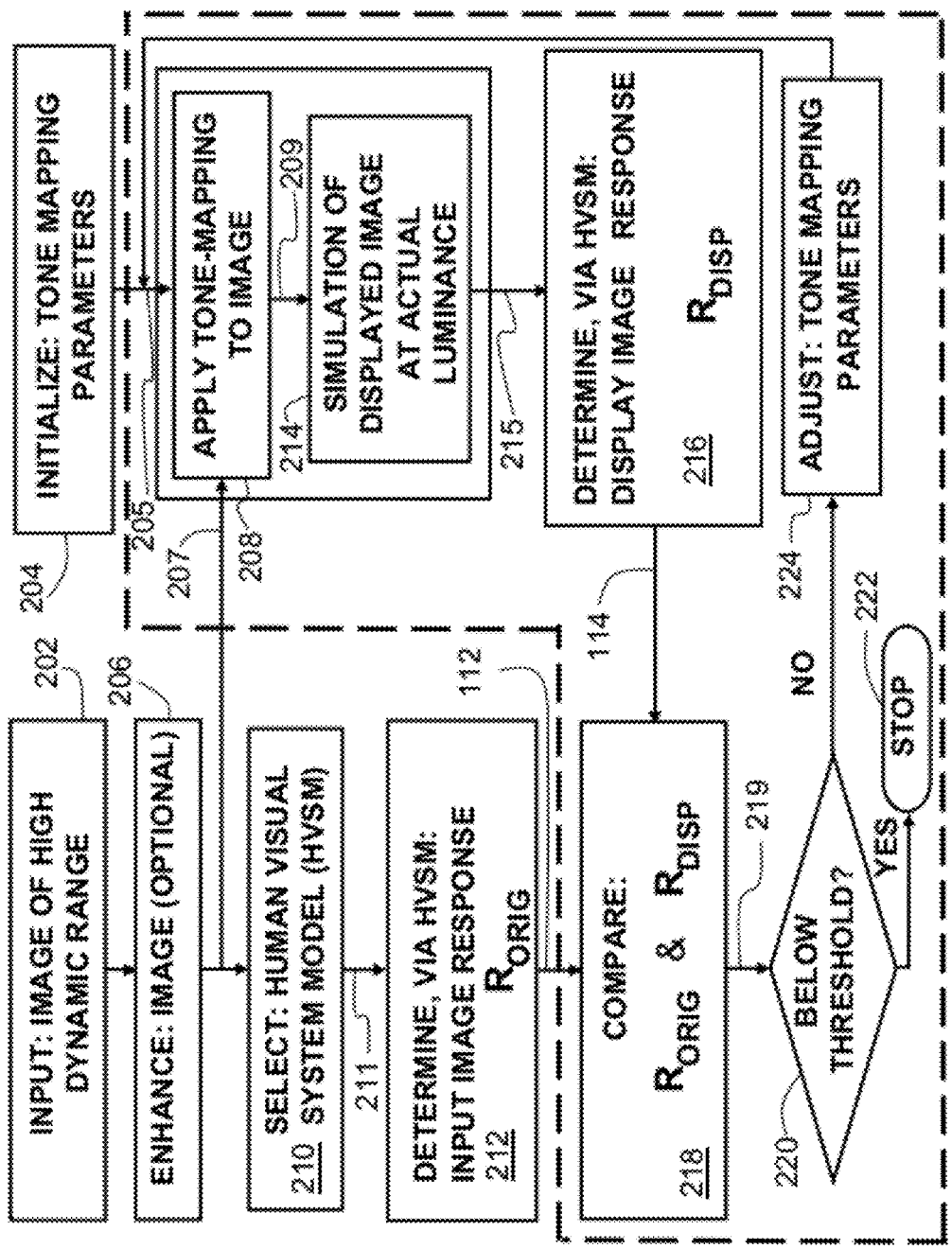
FIG. 2 is an exemplary top-level flow chart of a process embodiment of the present invention.

An exemplary process flow may be represented in FIG. 2 where the inputs are a high quality image 202, e.g., an image having high dynamic range, and initial values for tone-mapping parameters 204. The high quality image may be optionally enhanced 206. A human visual system model (HVSM) is selected 210 to map the high quality image 207 into a representation of the human-perceived model of the high quality image 211. The human-perceived model of the high quality image 211 is used to determine 212 the response of the original image 112, $R_{ORIG}$. The high quality image also provides a reference 207 from which the display-adapted image 209 is generated 208 based on tone-mapping parameters 205. A display model may be applied 214 to the display-adapted image 209, or DAI, and after application of the display model the resulting DAI 215 may then provide the basis for determining 216, via the human visual system model, the response of the display-adapted image 114, $R_{DISP}$. A performance index based on characterizing the difference 219 between the response of the original image 112, $R_{ORIG}$ and the response of the display-adapted image 114, $R_{DISP}$, may be generated (step 218). The display-adapted image 114, $R_{DISP}$, may then be iteratively regenerated using adjusted tone-mapping parameters 224 to reduce a characterization of the difference between the response of the display-adapted image 114, $R_{DISP}$, and the response of the original image 112, $R_{ORIG}$. A stopping rule for iterative adjustments to the tone-mapping parameters may be based on comparisons of current and previous performance index values and/or absolute performance index values and/or maximum global pixel difference. Such test values 219 may be compared 220 with a threshold value and if the test value being applied 219 is found to be below a threshold, then tone-mapping parameters used to generate the display-adapted image are treated as satisfactory, requiring no further adjustment 222. If however, the test value being applied 219 is above the threshold, then the tone-mapping parameters are adjusted 224, typically based on an error metric generated in the course of comparing the display-adapted image 114, $R_{DISP}$, and the original image 112, $R_{ORIG}$, and the adjusted tone-mapping parameters are used in the determination of a recalculated response of the display-adapted image 114, $R_{DISP}$. In this way, the cycle may be repeated until the test value being applied 219 is found to be below the selected threshold.

Tone-Mapping Operator

As part of a tone-mapping operator (TMO) embodiment for a particular application, a suitable perceptual model may be applied and error metric may be selected. For example, an operator that may produce a visual response found to be visually pleasing to humans, could be applied with an appearance model, while an operator that may maximize visibility, e.g., for aircraft cockpit displays, could be applied with a detection model. The particular tone-mapping process may be customized to its particular application, where such customization may include ranging for brightness adjustment, e.g., the level of backlight in a mobile display, to local tone-mapping operators used to process digital photographs. Often in computationally practicable applications, an optimization framework may be a simplified framework that, if possible, may be reduced to a close-form solution. Existing tone-mapping operators may be integrated into embodiments of the present invention where steps are taken to automatically adjust the TMO parameters for a given image, display and viewing condition.

Figure 3:
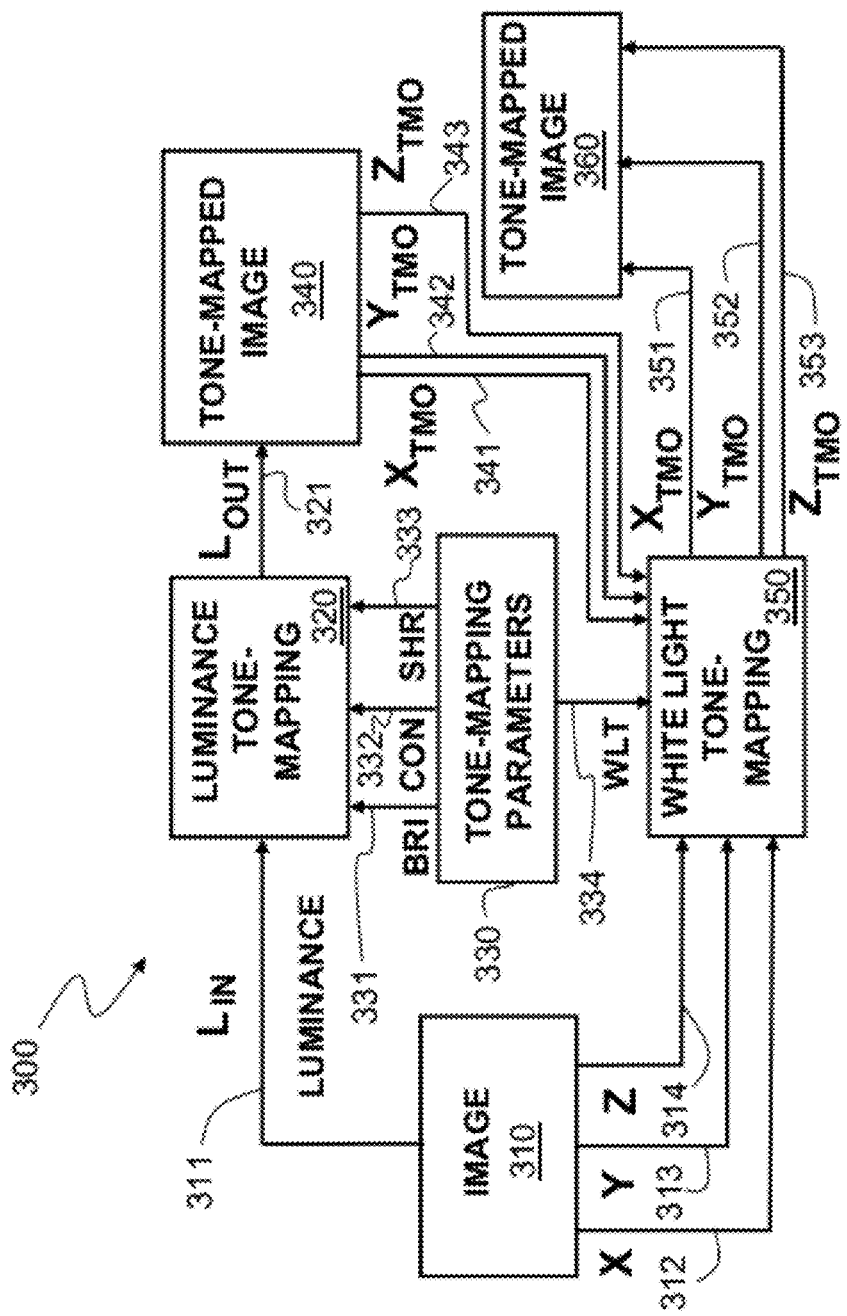
FIG. 3 is an exemplary functional block diagram of a portion of a process embodiment of the present invention.

An exemplary tone mapping operator is described as having adjustable parameters. FIG. 3 illustrates a process 300 where an image 310 may be characterized by its luminance 311 and its chrominance. It may also be represented in XYZ color space having pixel components X 312, Y 313, and Z 314. The image luminance may be termed as the input luminance 311, $L_{IN}$, and may be processed by luminance tone-mapping 320 using a subset of the exemplary tone-mapping parameters 330 comprised of brightness 331, contrast 332 and sharpness 333, in order to generate a tone-mapped output luminance 321, $L_{OUT}$. That is, the output luminance 321, $L_{OUT}$, may be expressed as a linear combination of a mean luminance component, a high pass luminance component, and a low pass luminance component where each component is weighted by a tone-mapping parameter from the set of tone-mapping parameters 330. A resulting tone-mapped image 340 may be generated based on the output luminance 321, $L_{OUT}$, and this resulting tone-mapped image 340 may be represented in XYZ color space where the tone-mapped X component may be represented as $X_{TMO}$ 341, the tone-mapped Y component may be represented as $Y_{TMO}$ 342 and the tone-mapped Z component may be represented as $Z_{TMO}$ 343. The tone-mapped components $X_{TMO}$ 341, $Y_{TMO}$ 342, and $Z_{TMO}$ 343 may be further processed via white light tone-mapping 350 that employs a white light weighting 334 and references the image 310 as represented in XYZ space 312, i.e., the original pixel component values, X 312, Y 313, and Z 314. The further processed tone-mapped components $X_{TMO}$ 351, $Y_{TMO}$ 352, and $Z_{TMO}$ 353 may then represent a tone-mapped imaged 360 affected by four tone-mapping parameters: brightness 331, contrast 332, sharpness 333, and a white light weighting 334.

Figure 4:
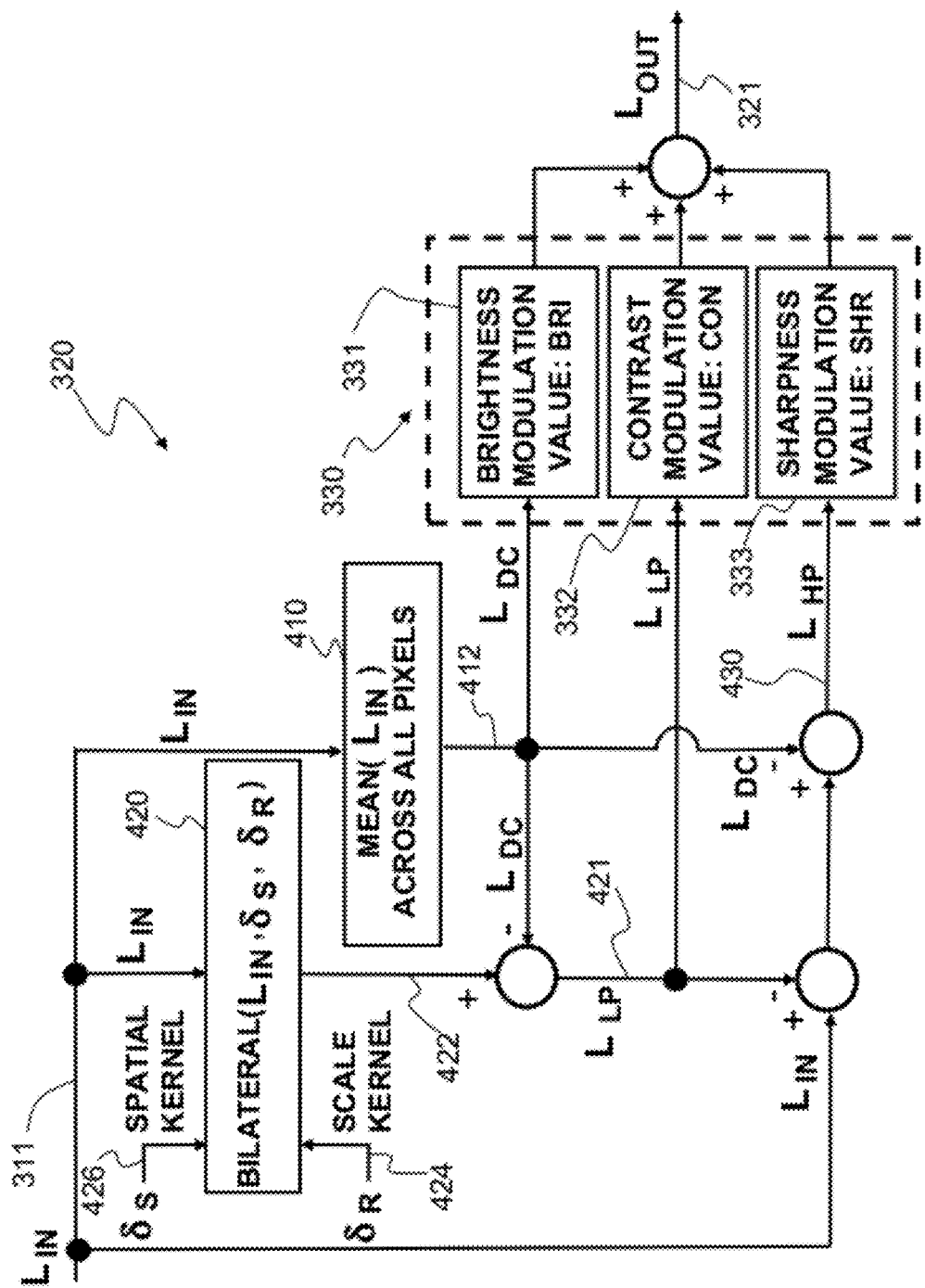
FIG. 4 is an exemplary functional block diagram of a portion of a process embodiment of the present invention.

FIG. 4 illustrates an exemplary functional block diagram of the luminance tone-mapping processing 320 for forming the output luminance 321, $L_{OUT}$. The mean luminance of all the pixels of an input image may be determined via a mean processing module 410 as the "direct current," or DC, luminance 412, $L_{DC}$. A bilateral filter 420 such as a fast or piecewise-linear bilateral filter of U.S. Pat. No. 7,146,059 that issued to Durand et al. Dec. 5, 2006, may be applied to the input luminance 311, $L_{IN}$, to determine the low pass component 421, $L_{LP}$, after the DC luminance 412 is extracted from the output 422 of the bilateral filter 420. The exemplary bilateral filter 420, when represented as a function, has as arguments $L_{IN}$, $\delta_R$ and $\delta_S$. In this example, $\delta_R$ is the width of the Gaussian kernel 424 used for value range weighting in the bilateral filter processing and may be set to a value of 1.46, which is the logarithm of the ratio between black and white diffuse surfaces (i.e., $\log_{10}(0.90/0.31)=1.46$). Also in this example, $\delta_S$ is a parameter representing the width of the Gaussian kernel for spatial filtering 426 and may be set adaptively based on the viewing distance. Accordingly, the low pass luminance component 421, $L_{LP}$, may be expressed as the output of the bilaterally filtered input luminance, $L_{IN}$, less the DC component 412, $L_{DC}$, as follows:

$$L_{LP} = \text{bilateral}(L_{IN}, \delta_S, \delta_R) - L_{DC}. \quad [\text{Eq. 1}]$$

The high pass luminance component 430, $L_{HP}$, may be expressed as the input luminance 311, $L_{IN}$, less the low pass luminance component 421, $L_{LP}$, and less the DC component 412, $L_{DC}$, as follows:

$$L_{HP} = L_{IN} - L_{LP} - L_{DC}. \quad [\text{Eq. 2}]$$

Three of the tone-mapping parameters 330 may be applied to the high pass luminance component 430, $L_{HP}$, the low pass luminance component 421, $L_{LP}$, and the DC component 412, $L_{DC}$. In particular, the brightness modulation value 331, bri, the contrast modulation value 332, con, and the sharpness modulation value 333, shr, may be applied respectively to weight the mean pixel luminance 412, $L_{DC}$, the low pass luminance component 421, $L_{LP}$, and the high pass luminance component 430, $L_{HP}$, and to generate the output luminance 321, $L_{OUT}$, as follows:

$$L_{OUT} = bri*L_{DC} + con*L_{LP} + shr*L_{HP}. \quad [\text{Eq. 3}]$$

The saturation of colors of an image is perceived by human vision to increase with the compression of luminance contrast. While one may invoke desaturation of all of the pixels of the image to address this perceptual artifact of the luminance contrast compression, a present exemplary process adds white light to an image. In particular, white light may be added to components of the luminance tone-mapped image in the XYZ space of pixel component values. Also, $X_W$, $Y_W$ and $Z_W$ may represent the normalized luminance components of white color (i.e., 0.95; 1; 1.089 for a D65 white point, International Commission on Illumination), and with may be a white light weighting.

Figure 5:
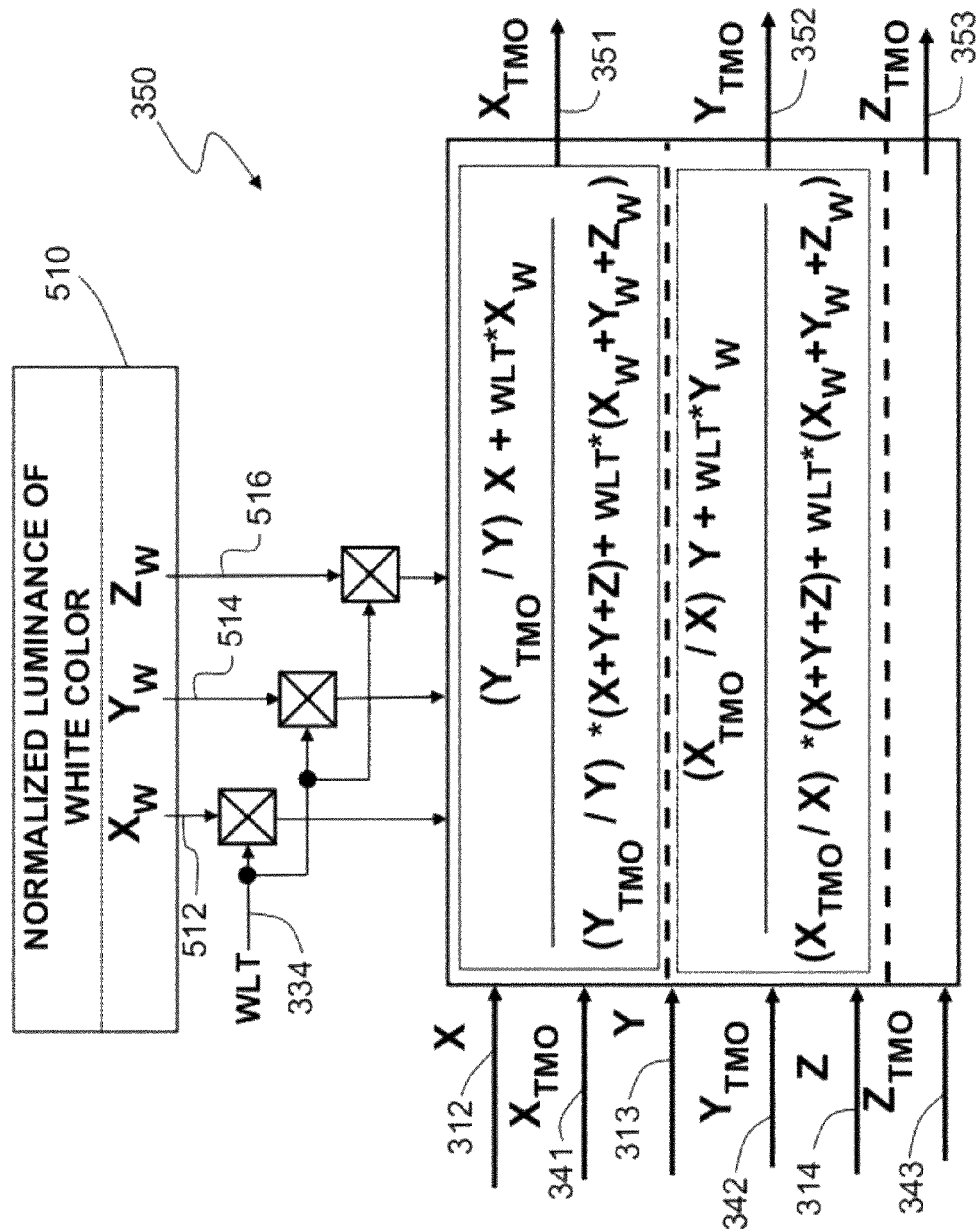
FIG. 5 is an exemplary functional block diagram of a portion of a process embodiment of the present invention.

FIG. 5 illustrates further tone-mapping 350 using white light weighting where the normalized luminance of white color 510, expressed in pixel components $X_W$ 512, $Y_W$ 514 and $Z_W$ 516 are each weighted by the white light weighting parameter 334, wlt. A tone-mapped component, $X_{TMO}$ 341, may be expressed in relation to the original pixel component values, X, Y and Z, and as a function of the white light weighting, wlt, as follows:

$$X_{TMO} = ((Y_{TMO}/Y)*X + wlt*X_W)/(R*(X+Y+Z) + wlt*(X_W + Y_W + Z_W)); \quad [\text{Eq. 4}]$$

and similarly, a tone-mapped component, $Y_{TMO}$, may be expressed as follows:

$$Y_{TMO} = ((X_{TMO}/X)*Y + wlt*Y_W)/(R*(X+Y+Z) + wlt*(X_W + Y_W + Z_W)). \quad [\text{Eq. 5}]$$

Image Enhancement

Image enhancement, which modifies the original image to improve its appearance, may optionally be integrated into tone-mapping framework embodiments of the present invention. Human viewers tend to prefer images that are sharper, have higher contrast and more saturated colors, as would be expected when viewing the original scenes from which the images are based. Image enhancement may also be described as a restoration process, where distortions produced in the recording of images, such as camera distortions, are removed from the captured image. The typical modulation transfer function (MTF) of a lens system is lower than one at low spatial frequencies, thus accounting for degraded image contrast, and the MTF is even lower for high spatial frequencies, which accounts for reductions in sharpness. Accordingly, sharpening and contrast enhancement together may be regarded as a restoration process for such camera distortions.

Display Model

Figure 6:
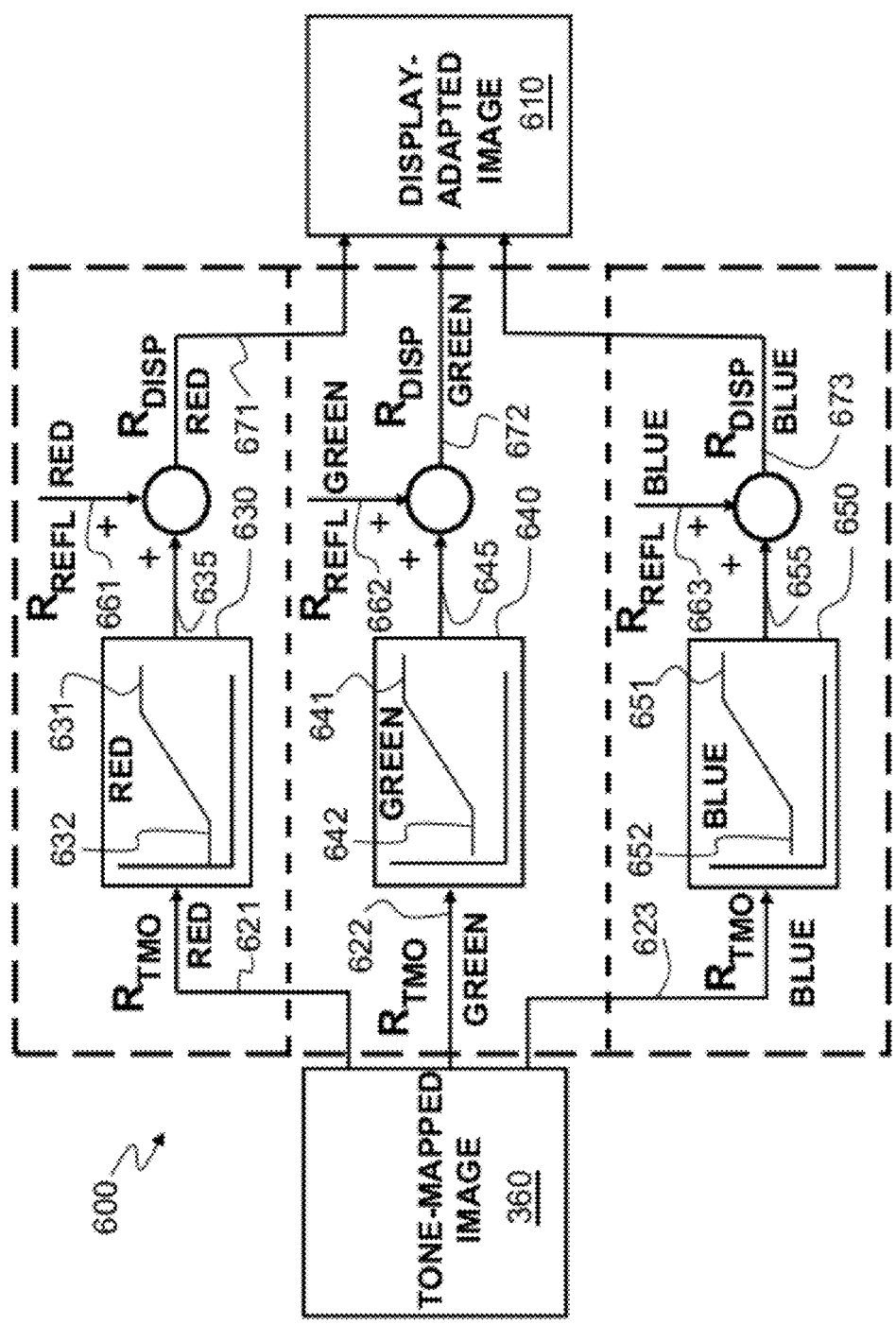
FIG. 6 is an exemplary functional block diagram of a portion of a process embodiment of the present invention.

A display model processing module or component may be applied to account for some of the limited capabilities of the target, or low dynamic range, display device, where the limited capability may include maximum brightness, dynamic range (contrast ratio) and color gamut (color primaries). These display capabilities are affected by the technical aspects of a display, as well as viewing conditions, such as ambient light that is reflected from a display panel. Illustrated by example in FIG. 6 is a process 600 whereby the tone-mapped image 360 may be adapted for the limitation of the target display resulting in a display-adapted image 610. The tone-mapped image 360 may be expressed in code values, e.g., a gamma-corrected color space, such as sRGB. That is, the tone-mapped image 360 may be expressed as a red radiance color component 621, $R_{TMO,RED}$, a green radiance color component 622, $R_{TMO,GREEN}$, and a blue radiance color component 623, $R_{TMO,BLUE}$. A display model may provide, as a result, the actual calorimetric values of a displayed image. If these values exceed the display capabilities, the values may be limited or clamped to the corresponding extremes or limits. For example, the lowest radiance producible by the target display for a particular color component, i.e., red, green, or blue color components, may be represented by a known value, $d_{min}$, and the highest radiance producible by the target display for the same particular color component may be represented by a known value, $d_{max}$. So, the red radiance color component 621, $R_{TMO,RED}$, may be tested and limited by a red threshold limiter 630 from above by a $d_{max}$ value for the red component 631 and limited from below by $d_{min}$, value for the red component 632. Likewise, the green radiance color component 622, $R_{TMO,GREEN}$, may be tested and limited by a green threshold limiter 640 from above by a $d_{max}$ value for the green component 641 and limited from below by $d_{min}$, value for the green component 642; and the blue radiance color component 623, $R_{TMO,BLUE}$, may be tested and limited by a blue threshold limiter 650 from above by a $d_{max}$ value for the blue component 651 and limited from below by $d_{min}$, value for the blue component 652. The output radiance value of the display model for a particular color component may be expressed as:

$$R_{disp} = [R_{tmo}]_{d_{min}}^{d_{max}} + R_{refl} \quad [\text{Eq. 6}]$$

where [.] operator restricts the values to be within the range from $d_{min}$ to $d_{max}$ and where a radiance bias, $R_{refl}$, is added to the potentially limited radiance to account for the amount of ambient light reflected from the panel. The red color component ambient light reflection bias 661, $R_{refl,red}$, may be approximated by:

$$R_{refl,red} = w_R * E_{amb} / \pi k, \quad [\text{Eq. 7}]$$

where $E_{amb}$ is ambient luminance given in lux, $w_R$ is a weighting factor for the red color component (e.g., $w_R$=0.2126; for the green color component: $w_G$=0.7152; and for the blue color component: $w_B$=0.0722, all for a D65 reference), and k is the reflectivity for a display panel, e.g., about 1% for LCD displays and may be expressed as a larger percentage for CRT displays. Accordingly, the green ambient light reflection bias 662, $R_{refl,green}$ may be approximated by:

$$R_{refl,green} = w_R * E_{amb} / \pi k, \quad [\text{Eq. 8}]$$

And the blue ambient light reflection bias 663, $R_{refl,blue}$, may be approximated by:

$$R_{refl,blue} = w_R * E_{amb} / \pi k \quad [\text{Eq. 9}]$$

The red radiance component 621 is tested 630 and may be limited and the tested red radiance component 635 may be combined with the red ambient light reflection bias 661 to generate a display-adapted red radiance component 671. The green radiance component 622 is tested 640 and may be limited and the tested green radiance component 645 may be combined with the green ambient light reflection bias 662 to generate a display-adapted green radiance component 672. The blue radiance component 623 is tested 650 and may be limited and the tested blue radiance component 655 may be combined with the blue ambient light reflection bias 663 to generate a display-adapted blue radiance component 673. The display adapted radiance components 671-673 may be combined to generate a display-adapted image 610.

Human Visual System Model

Figure 7:
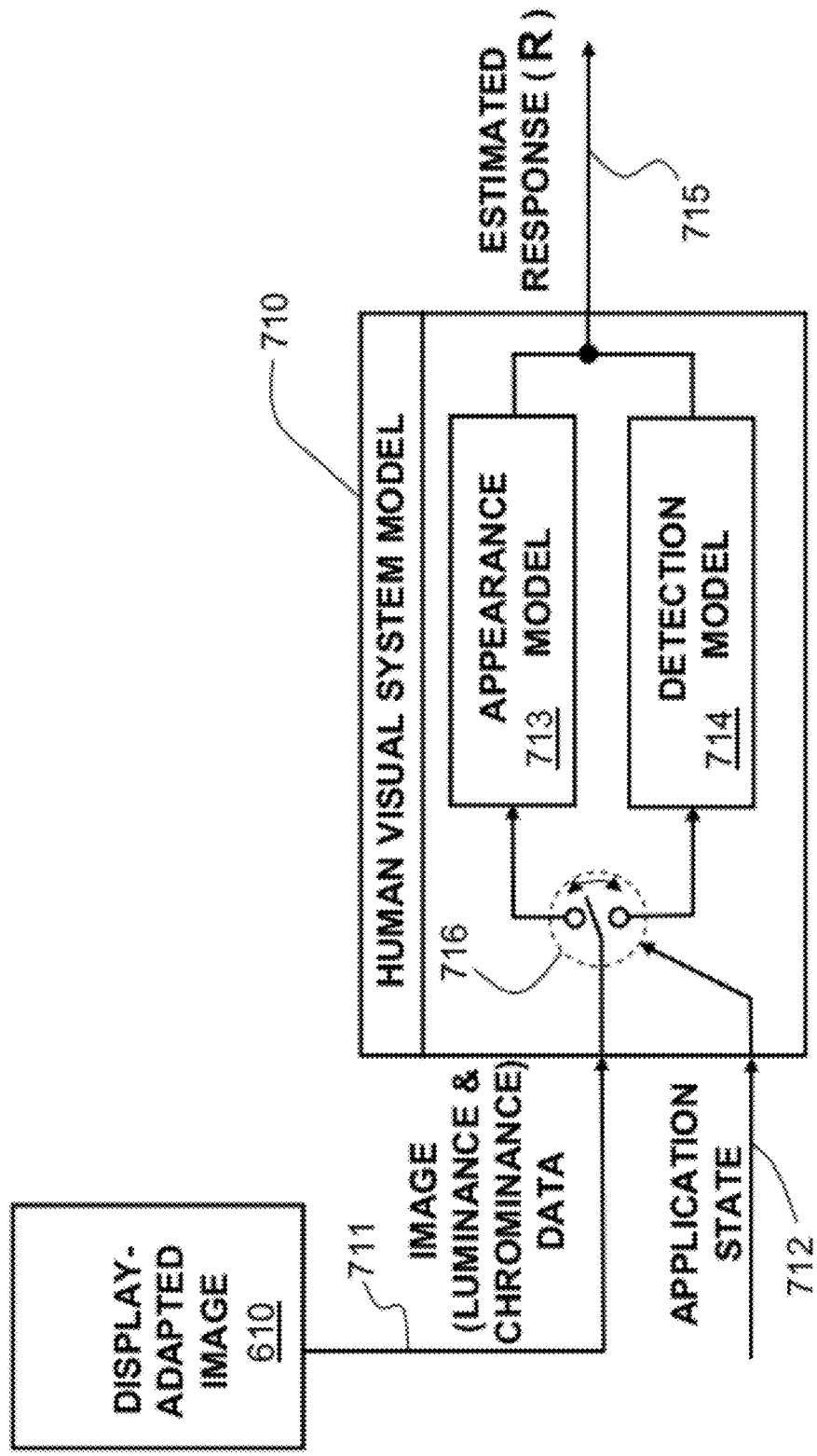
FIG. 7 is an exemplary functional block diagram of a portion of a process embodiment of the present invention.

In general, a human visual system model may include representations of the human such as color, eye movements, attention, temporal response, masking and stochastically corrupted representations that may be termed noise and for the present description, include luminance and spatial frequency responses. Illustrated in FIG. 7 is an exemplary top-level architecture model of an exemplary human visual system 710 that processes, as its input image data, e.g., luminance and chrominance data 711, in order to produce an estimated response 715 of the human visual system. The tone-mapping framework of the several embodiments of the present invention is general enough to accommodate a range of the visual models. A visual model, when applied to an image, can be a key component of the overall tone-mapping framework and accordingly, the visual model applied is typically profiled for a particular application. The estimated response 715 of the human visual system typically scales image features relative to their importance, according to the human visual system model selected 716 based on the intended application or application state 712. For example, the visual detection model 714, described below as an example of a luminance perception model, reduces the importance of very low and high frequencies because the actual human visual system is less sensitive to very low and high frequencies. For example, a tone-mapping for processing photographs may be better processed by the application of an appearance model 713, while the tone mapping for maximizing visibility of displayed information (e.g. cockpit display) may be better processed by the application of a detection model 714.

Figure 8:
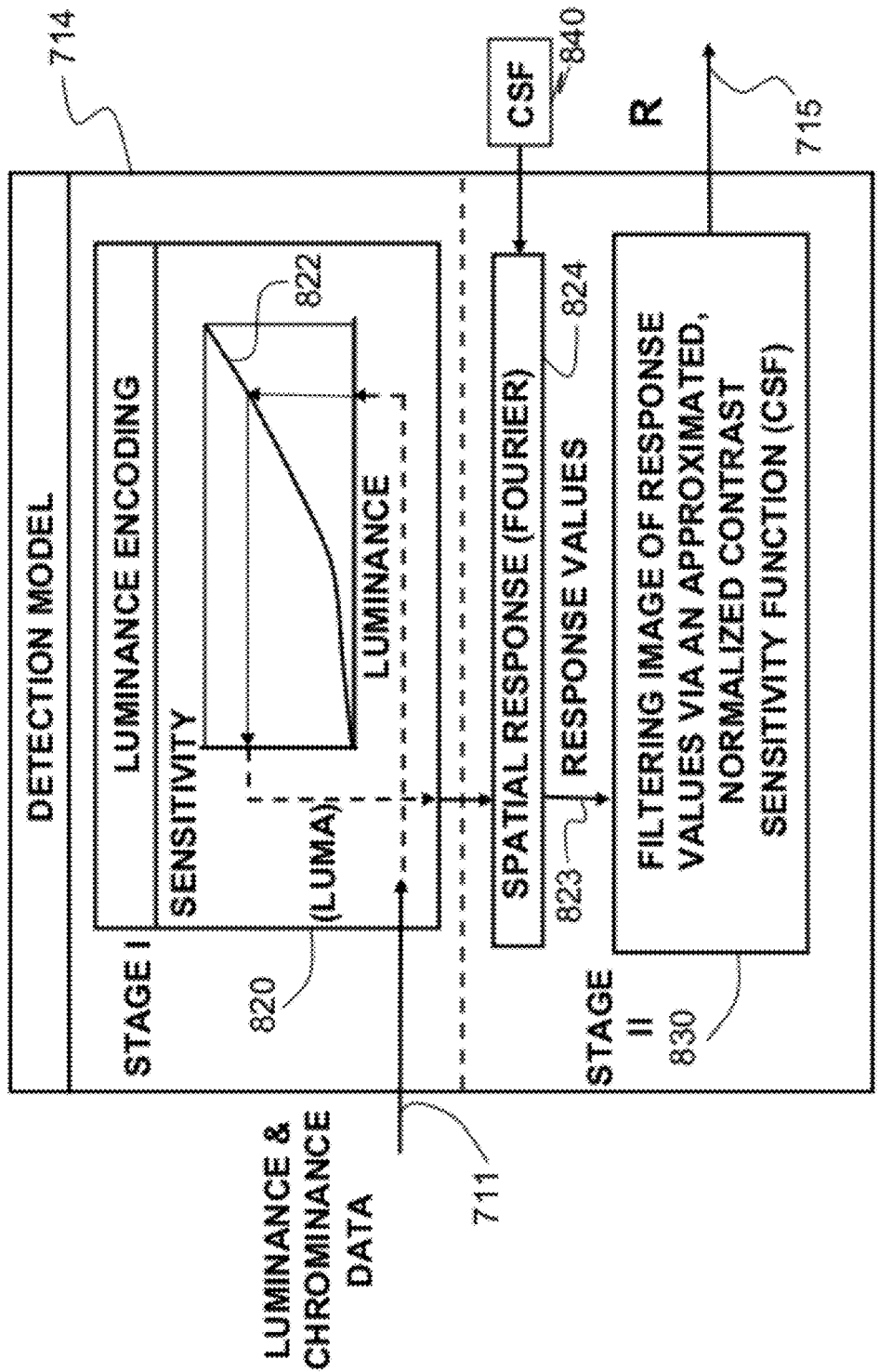
FIG. 8 is an exemplary functional block diagram of a portion of a process embodiment of the present invention.

FIG. 8 illustrates an example where the processing of the exemplary detection model as exemplary portions of an HVS model is comprised of two stages. The exemplary first stage comprises a human perception luminance model 820 of high dynamic range images via an exemplary extension of gamma curves used for encoding of standard dynamic range (SDR) images to the full visible range of luminance. In this example, the luminance is converted via a luminance sensitivity function to a response value that is approximately scaled in units of luma, which is a pixel gray-value used with a human luminance perception model such at the exemplary just-noticeable-difference (JND) encoding. The exemplary encoding may be derived from the luminance sensitivity function 822 and it may be referenced in order to scale luminance in approximately perceptually uniform units.

Figure 9A:
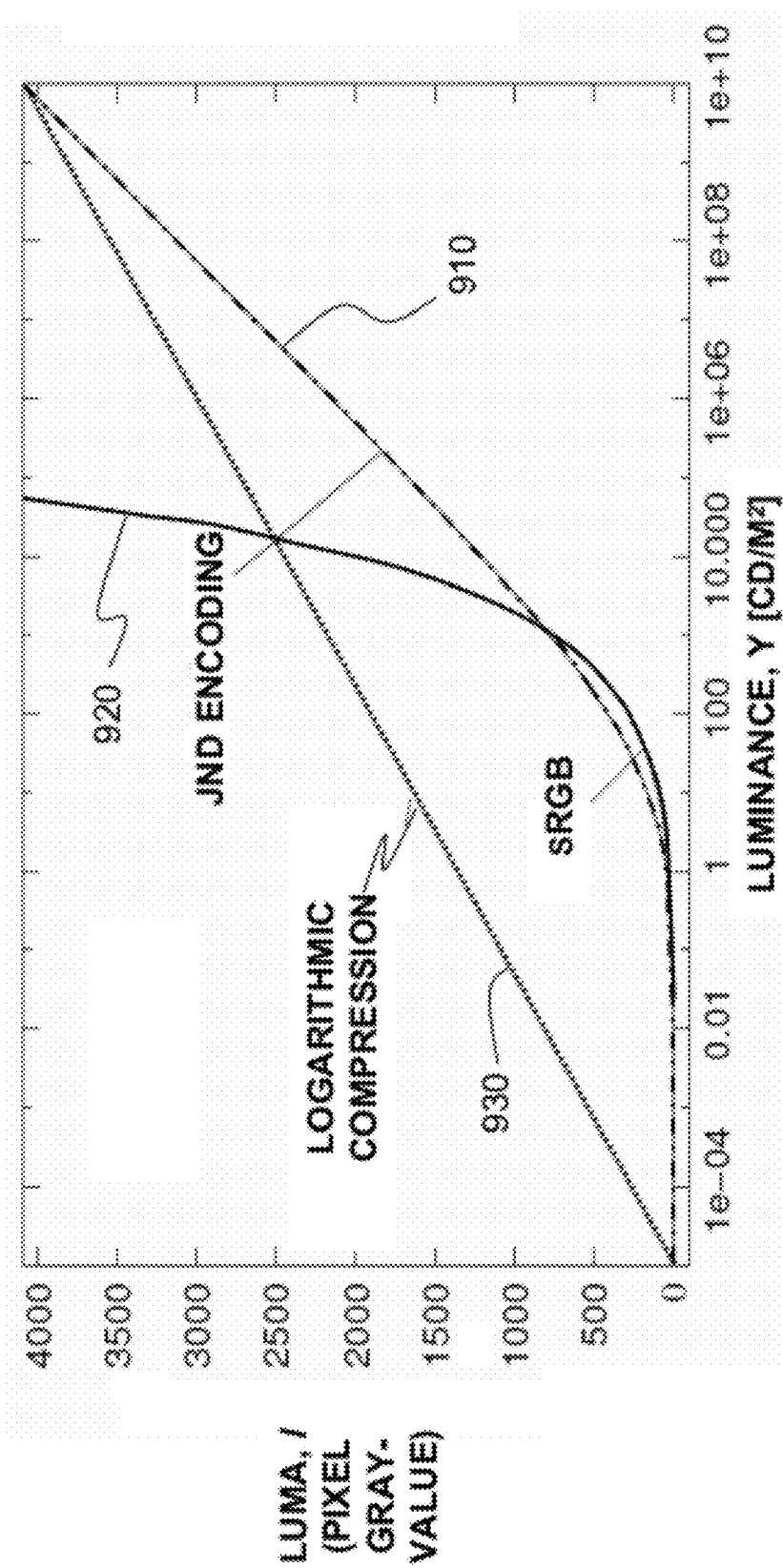
FIG. 9A is an exemplary graph of sensitivity models as functions of luminance.
Figure 9B:
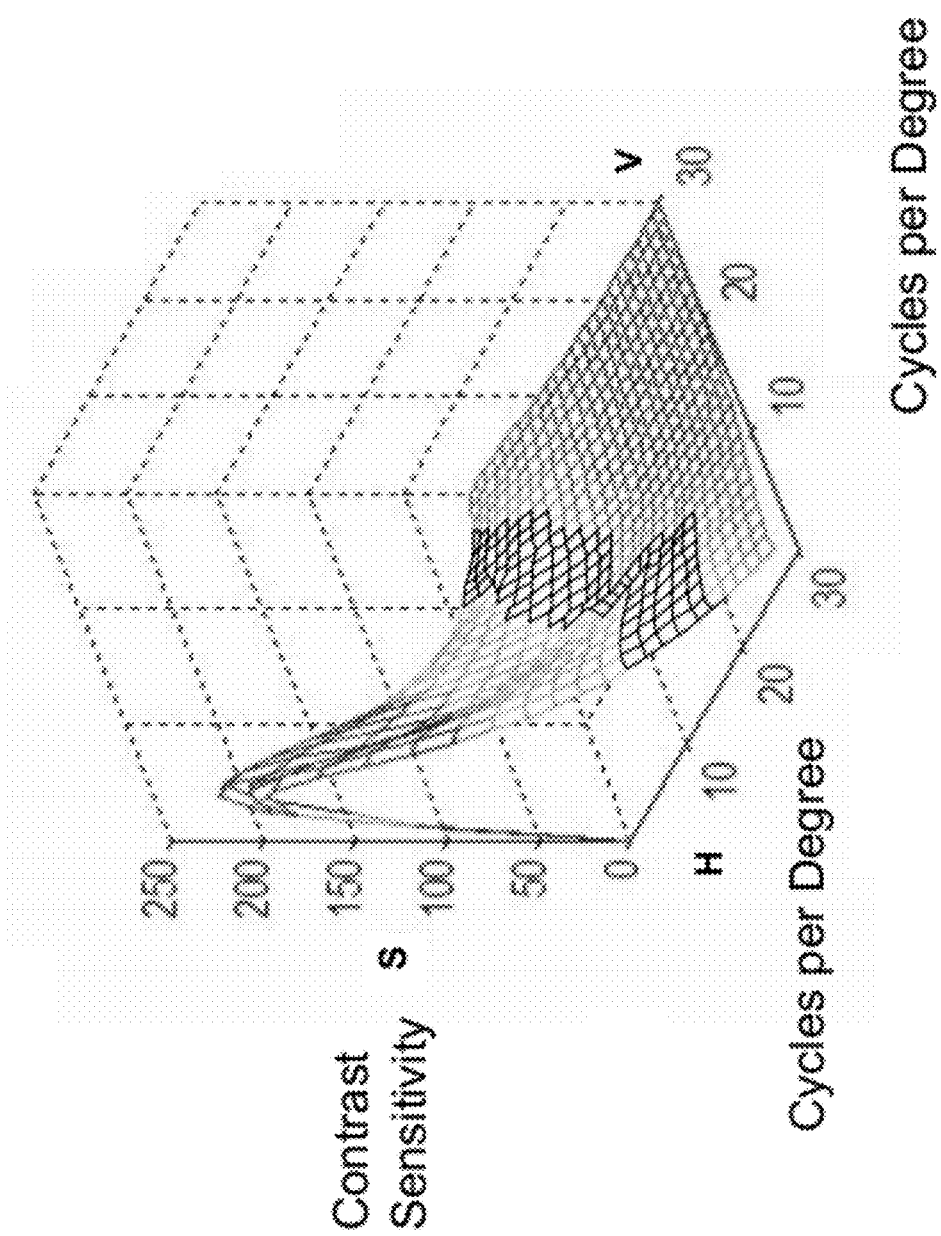
FIG. 9B is an exemplary graph of a contrast sensitivity model as a two-dimensional function of spatial frequency.

The luminance may be modified by a human luminance perception model. FIG. 9A shows the shape of the exemplary luminance encoding or modifying function 910, labeled JND encoding, compared with a typical SDR encoding 920, e.g., gamma correction for the sRGB color space 920, and logarithmic compression 930. FIG. 9B shows an exemplary CSF as a function of two spatial dimensions, where the spatial dimensions are in units of cycles per degree. The exemplary CSF may be applied to shape the spatial frequency response, for example, the response of the image after modification by a human luminance perception model.

Returning to FIG. 8, as part of the second stage, the image of the response values 823 may be filtered 830 in the 2D Fourier (spatial frequency) domain 824 by a normalized contrast sensitivity function (CSF) 840. A CSF may be characterized as a two-dimensional spatial filter. An exemplary CSF may be applied by example by assuming a test patch size of one-visual degree and by neglecting no effects of orientation and eccentricity. The CSF values may be adjusted for low frequencies, so that the minimum normalized sensitivity is 20%. An exemplary normalized CSF may be approximated by:

$$CSF(\rho, l_{adapt}) = \begin{cases} \exp\left(-\frac{|\rho/\rho_{peak} - 1|^{\beta_1}}{2\sigma_1^{\beta_1}}\right); \text{ for } \rho \leq \rho_{peak} \\ \exp\left(-\frac{|\rho/\rho_{peak} - 1|^{\beta_2}}{2\sigma_2^{\beta_2}}\right); \text{ for } \rho > \rho_{peak} \end{cases} \quad [\text{Eq. 10}]$$

where $\rho$ is the spatial frequency given in cycles per degree, $\sigma_1$=0.61059, $\beta_1$=2.362, $\sigma_2$=0.95127, $\beta_2$=1.1453, and where $\rho_{peak}$ is the frequency of the peak sensitivity and is given by:

$$\rho_{peak} = \frac{a}{b + l_{adapt}^d} + c \quad [\text{Eq. 11}]$$

where the parameter $l_{adapt}$ is the adaptation luminance in candela per square meter (cd/m²) and the constants are: a=1.1453, b=1.4607, c=5.1159 and d=0.50285.

Figure 10:
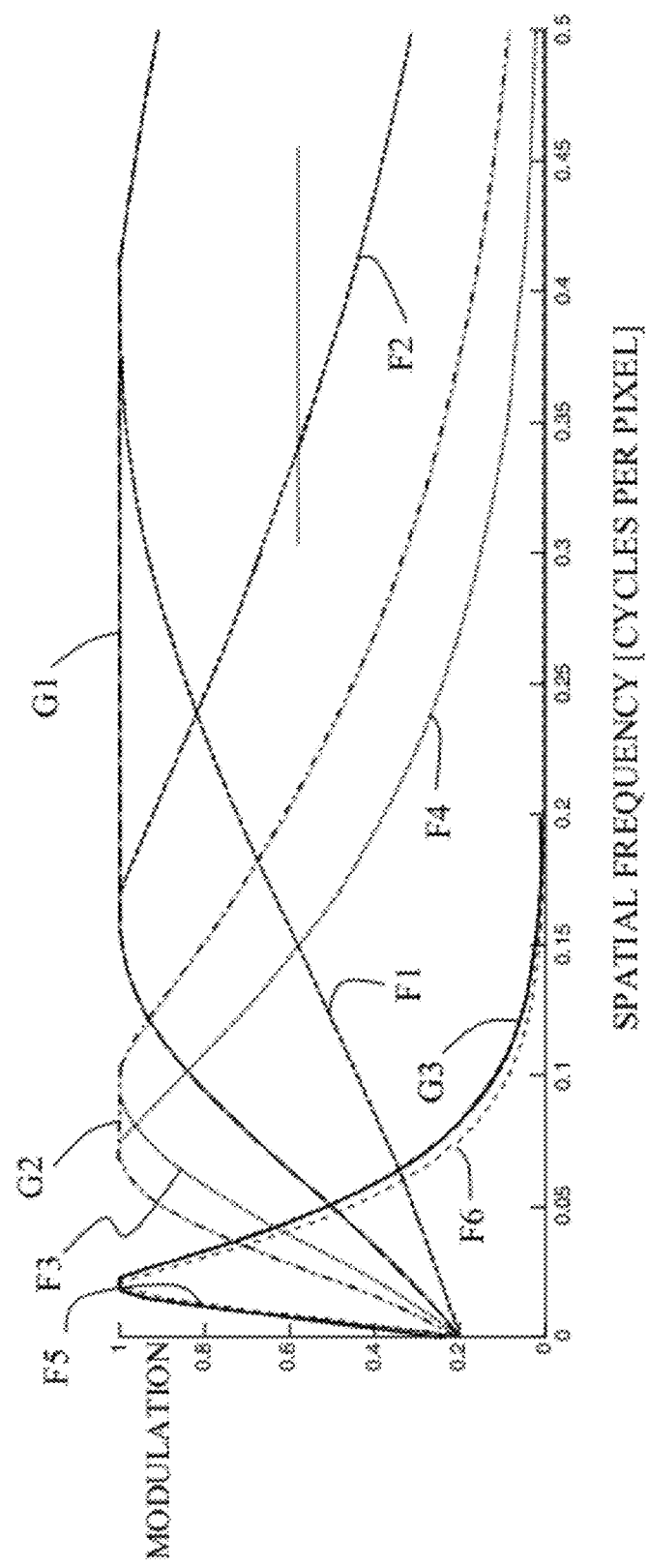
FIG. 10 is an exemplary graph of normalized contrast sensitivity functions shown along one spatial frequency axis.

Human contrast sensitivity and accordingly the various models of CSF strongly depend on the viewing distance. Since observers are unlikely to watch images from a fixed distance, a CSF may be generated for the minimum and maximum assumed viewing distances and then an envelope of these two resulting functions may be used to approximate CSF for the range of viewing distances. Such refined CSF models may then be applied in the various embodiments of the present invention. Examples of CSF functions for different viewing distances are shown in FIG. 10 plotted as the modulation of the contrast sensitivity as a function of spatial frequency in cycles per pixel. Normalized for display heights, the following CSF curves may be referenced for fixed viewing distances: (a) F1 represents a viewing distance of 0.5 display heights; (b) F2 represents a viewing distance of 1.5 display heights; (c) F3 represents a viewing distance of 2.5 display heights; (d) F4 represents a viewing distance of 3.5 display heights; (e) F5 represents a viewing distance of 11.5 display heights; and (f) F6 represents a viewing distance of 12.5 display heights. Normalized for display heights, the following CSF curves may be referenced for a range of viewing distances: (a) G1 represents a viewing distance range of 0.5 to 1.5 display heights; (b) G2 represents a viewing distance range of from 2.5 to 3.5 display heights; and (c) G3 represents a viewing distance range of from 11.5 to 12.5 display heights. Accordingly, the CSF curves of G1, G2, and G3 may be applied as shaping functions in two spatial dimensions, e.g., in the 2D Fourier conditioning or shaping of the image in the spatial frequency domain.

Error Metric

An error metric in the framework of the several embodiments of the present invention may be responsible for computing the difference between the response of the selected portions of the human visual system model as applied to the original scene and the response of displayed image, as affected by the tone-mapping parameters via the TMO. Such an error metric may yield a single number, which can be designed to be the value of the objective function that may be minimized via the variation in the tone-mapping parameters. One example of an objective function may be the mean square error, MSE, across a display image comprised of M by N pixels:

$$MSE = \frac{1}{M \times N} \sum_{m=0}^{M-1} \sum_{n=0}^{N-1} (R_{orig}[m,n] - R_{disp}[m-n])^2. \quad [\text{Eq. 12}]$$

An exemplary stopping rule is where the MSE is below a threshold, $MSE_{min}$, i.e., $$MSE < MSE_{min}, \quad [\text{Eq. 13}]$$

and/or where largest pixel-by-pixel difference, i.e., the maximal pixel difference, is below a threshold, $R_{error}$, i.e., $$\max_{M,N}(R_{orig}[m,n] - R_{disp}[m,n]) < R_{error}. \quad [\text{Eq. 14}]$$

Figure 11:
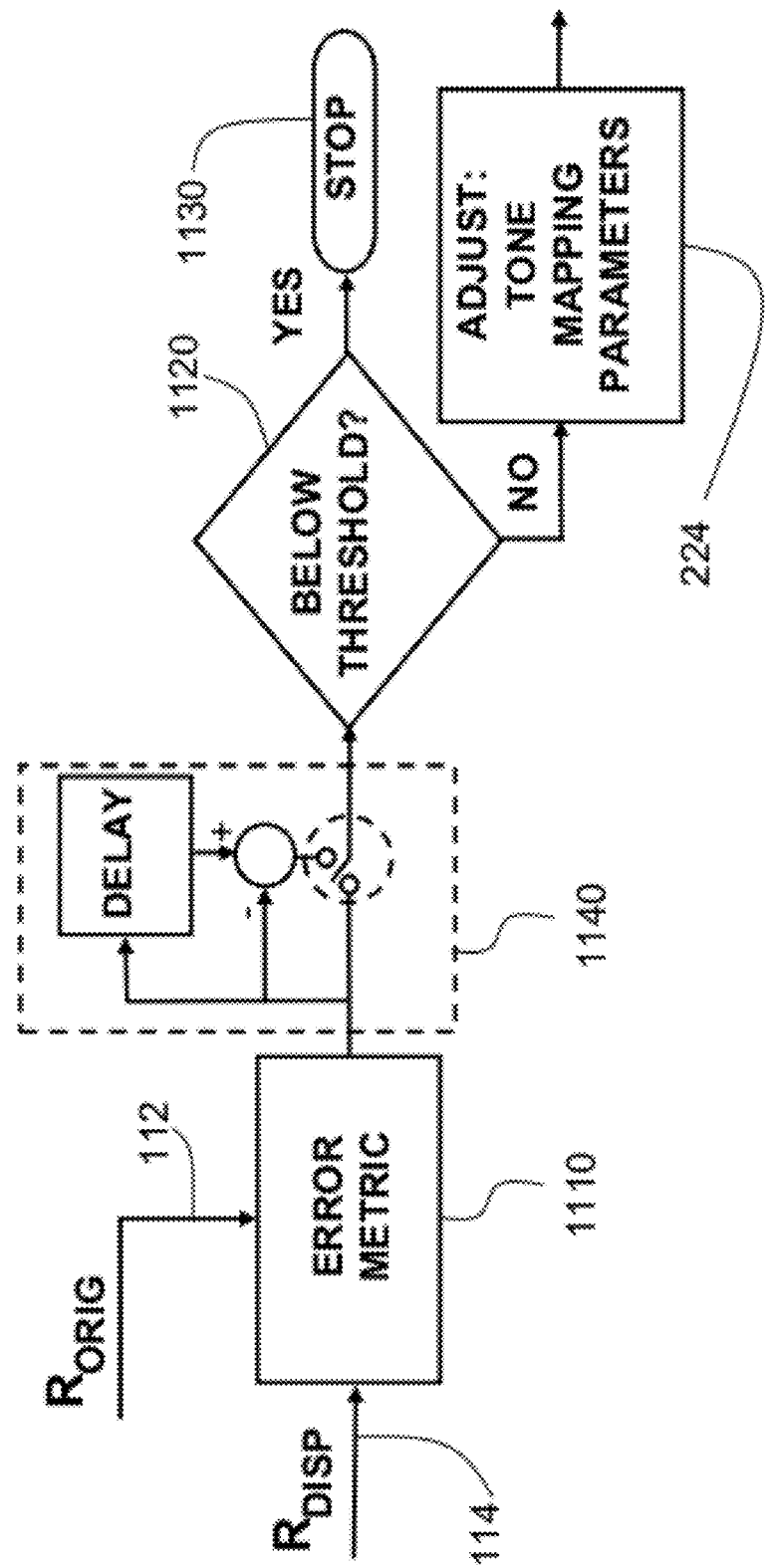
FIG. 11 is an exemplary functional block diagram of a portion of a process embodiment of the present invention.

Illustrated in FIG. 11 is an exemplary process flow diagram for both the determination of an error and a stopping test where a visual display response 114, $R_{disp}$, and the original or reference scene 112, $R_{orig}$, are compared via, for example, the objective function, where the resulting error metric made may be driven practicably close by changes in the tone-mapping parameters 224 to effect changes in the response visual display response 114, $R_{disp}$. In some embodiments, once the error metric 1110, or changes in the error metric 1140, are driven to values below a threshold 1120, the adjusting of the tone-mapping parameters is stopped 1130. Otherwise, the adjustments to the tone-mapping parameters 224 may be made to cause the resulting objective function to further decrease, as in the case of a minimization formulation. In other embodiments, the error metric may drive the magnitude and direction of adjustments in one or more of the tone-mapping parameter while a separate stopping test is made, pixel-by-pixel, of the maximum difference between the visual display response 114, $R_{disp}$, and the original visual display response 112, $R_{orig}$. Other parameter adaptation mechanisms may be employed as well as other stopping rules without deviating from the scope of the invention disclosed by way of exemplary embodiments herein.

Accordingly, the reduction in the difference display response 114, $R_{disp}$, and the original or reference scene 112, $R_{orig}$, may be accomplished by characterizing the process as a nonlinear optimization problem, where a performance index, J, is a nonlinear function of the image response error having tone-mapping parameters: brightness (bri), contrast (con), sharpness (shr), and optionally white light weighting (wlt). The pixel-by-pixel comparison of the two two-dimensional matrices may be cast as, for example:

$$J = MSE(R_{orig} - R_{disp}) \quad [\text{Eq. 15.1}]$$

$$\text{Min } J \quad [\text{Eq. 15.2}]$$

Where the error term, $R_{orig} - R_{disp}$, is a nonlinear function of: con, bir, shr and wlt for a fixed CSF, as has been described by example herein.

$$\text{Constraints: } 0.0 \leq con \leq 1.5; \quad [\text{Eq. 15.3}]$$

$$-2.0 \leq bri \leq 1.0; \quad [\text{Eq. 15.4}]$$

$$-2.0 \leq shr \leq 3.0; \quad [\text{Eq. 15.5}]$$

and optionally, $$-2.0 \leq wlt \leq 3.0. \quad [\text{Eq. 15.6}]$$

For example, the minimization algorithm may be selected, by those of ordinary skill in the field, from constrained numerical gradient search processes including Modified Method of Feasible Directions.

Figure 12:
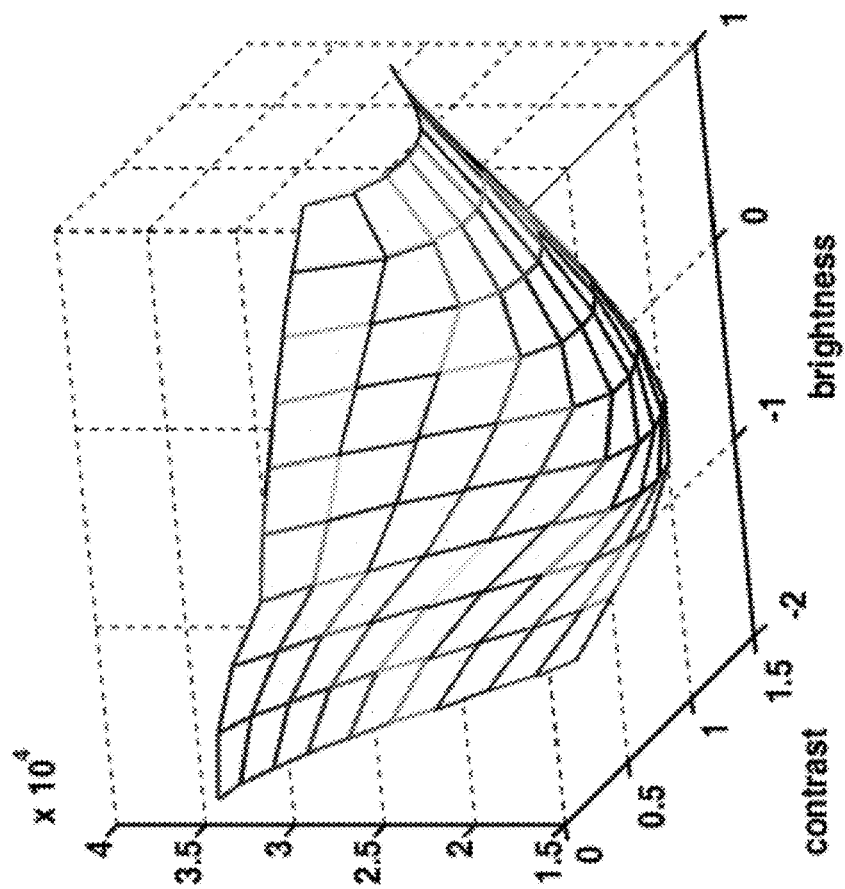
FIG. 12 is an exemplary graph of a visual error performance index as a function of brightness and contrast tone-mapping parameters.

An exemplary objective function, termed also as visual error or error metric, may yield a parabolic surface as shown by example in FIG. 12 when variations in contrast and brightness tone-mapping parameters are made. Such a parabolic function indicates a local stable solution that is independent of the particular bounded, initial, or starting, tone-mapping parameters.

EXAMPLES

The invention, in its several embodiments accommodates a range of tone-mapping operators and ranges, viewing conditions including ambient light and viewing distance applied with visual models used for modifying images. The following exemplary results include studies in ambient illumination, brightness of a target display, and the viewing distance. For these examples, the visual detection model explained above is applied, as are the tone mapping operator and its tone-mapping parameters as described in the previous sections. Calibrated HDR and SDR images were used as input each exemplary process.

Ambient Illumination Scenario

Figure 13A:
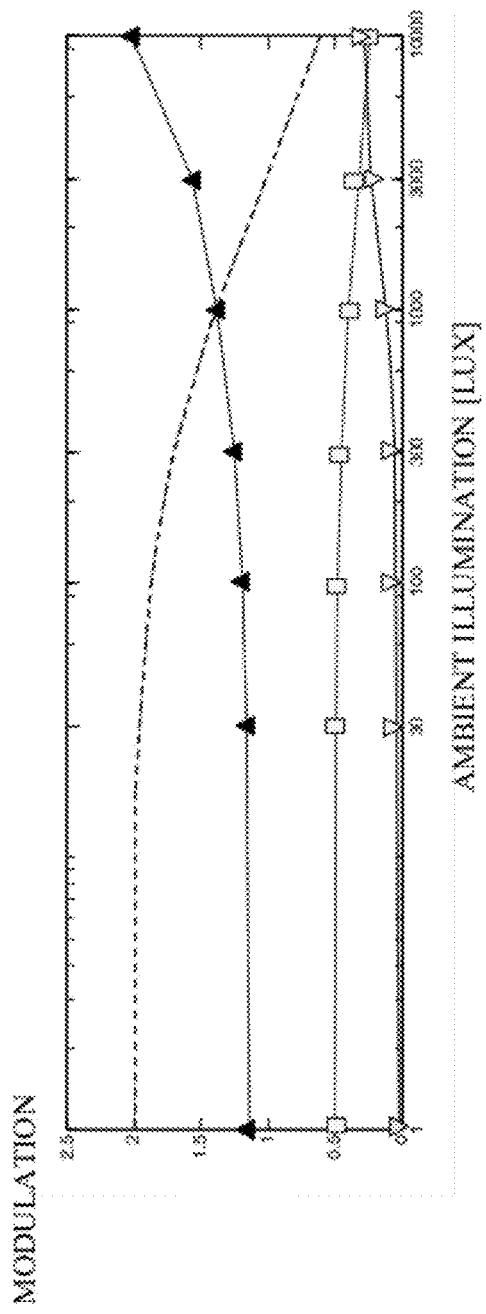
FIG. 13A is an exemplary graph of a resulting brightness, contrast, and sharpness tone-mapping parameters for a particular HDR display effective dynamic range as functions of ambient illumination.
Figure 13C:
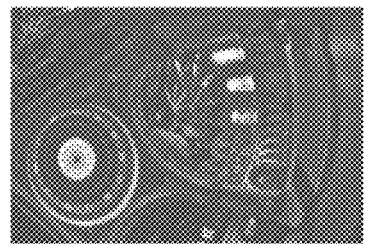
FIG. 13C is a sample HDR image at a higher ambient illumination level.
Figure 13B:
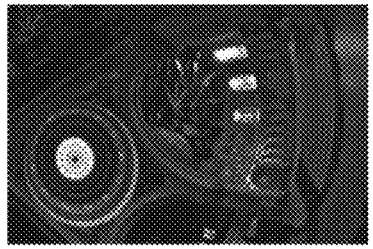
FIG. 13B is a sample HDR image.
Figure 14A:
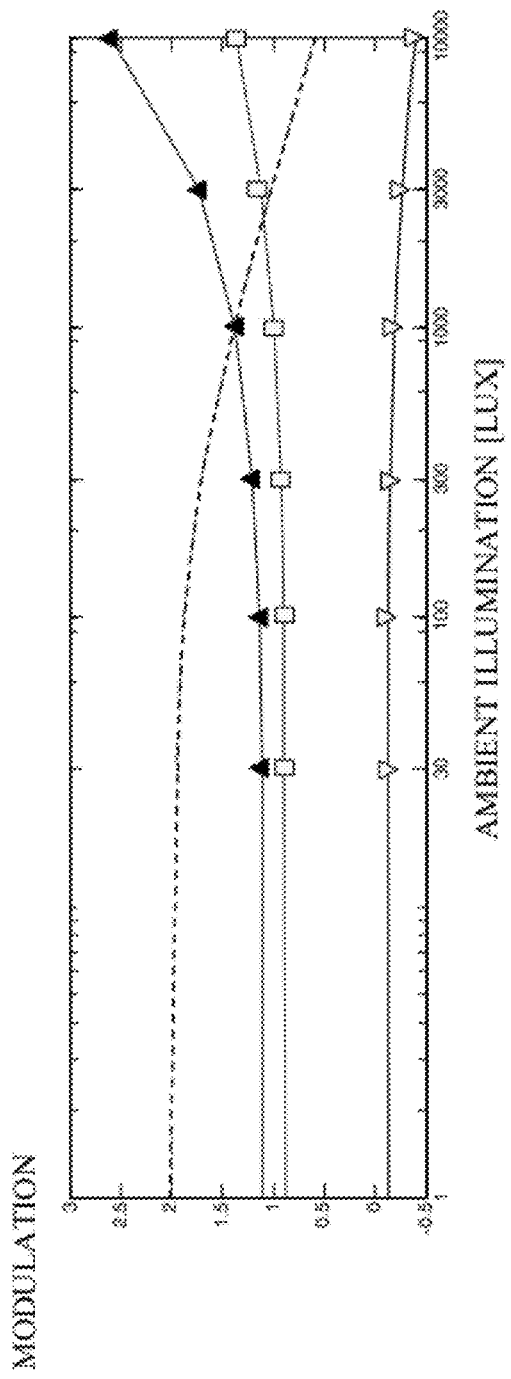
FIG. 14A is an exemplary graph of a resulting brightness, contrast, and sharpness tone-mapping parameters for a particular SDR display effective dynamic range as functions of ambient illumination.
Figure 14C:
FIG. 14C is a sample SDR image at a higher ambient illumination level.
Figure 14B:
FIG. 14B is a sample SDR image.

In the ambient illumination scenario, a change of an ambient light level is simulated to reflect the environment when the same, presumably mobile, display is viewed both indoors and outdoors. In cases of immobile displays, the change in ambient light may be due to such circumstances as daylight through windows and changes in lamp illumination. The exemplary display has a contrast ratio, i.e., dynamic range, of 1:100 and maximum brightness of 200 candles or candelas per square meter ($cd/m^2$). The change of tone-mapping parameters for the HDR image is shown in FIG. 13A with the images of the extreme cases shown in FIGS. 13B and 13C. The change of tone-mapping parameters for the SDR image is shown in FIG. 14A with the images of the extreme exemplary ambient illumination cases shown in FIGS. 14B and 14C.

Elevated ambient light level has the largest impact on the black level of the display, i.e., the luminance of a black pixel. As the ambient light increases, more light is reflected from the panel, effectively reducing the dynamic range of a display. Also, as a displayed image is pushed toward higher luminance levels, with increasing black levels, the contrast is reduced and the perceived sharpness of an image is typically reduced as well. To compensate for this and to preserve low contrast details, the exemplary tone-mapping process increases sharpness of an image. In this scenario, there is a significant difference in contrast modulation between HDR and SDR image. Since the dynamic range of HDR image cannot be accommodated on the target display, it must be reduced to at least 50%. However for the SDR image, the contrast is evenly enhanced for high ambient, to compensate for the loss of contrast. Such enhancement is usually done at the cost of clipping the brightest and the darkest pixels.

Brightness of a Display

Figure 15A:
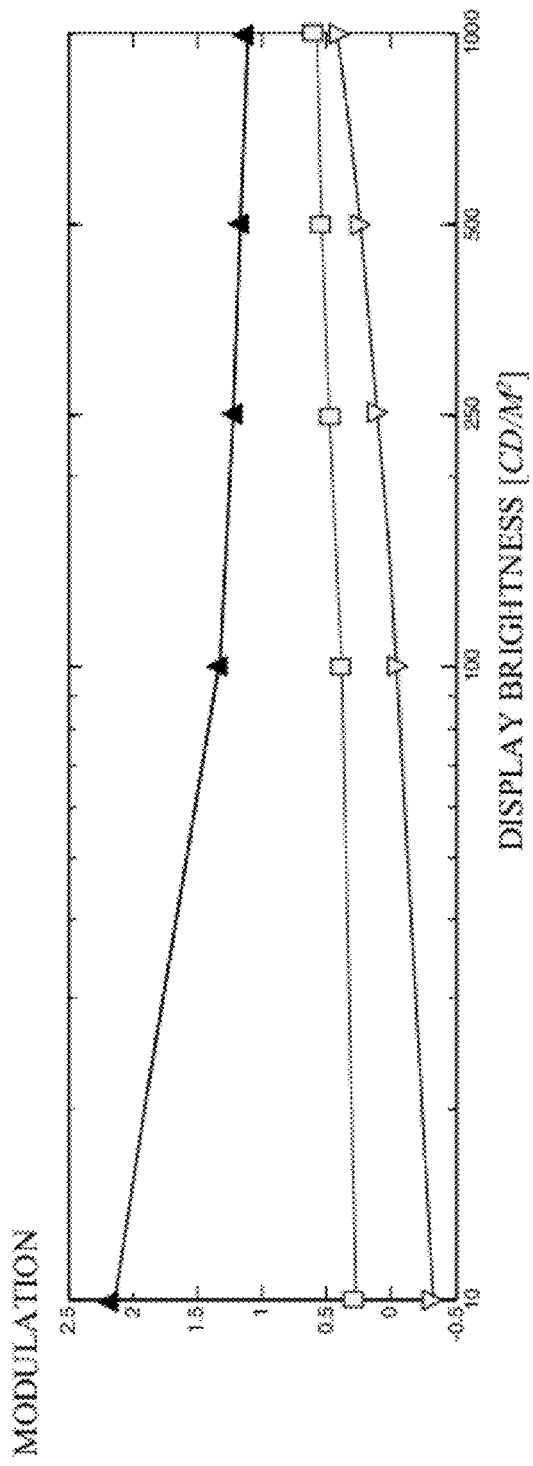
FIG. 15A is an exemplary graph of a resulting brightness, contrast, and sharpness tone-mapping parameters as functions display brightness.
Figure 15C:
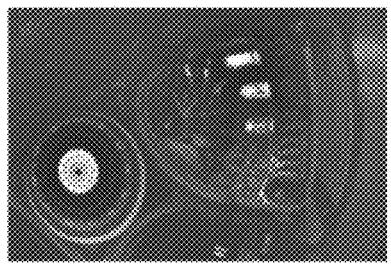
FIG. 15C is a sample image at 1,000 candelas per square meter.
Figure 15B:
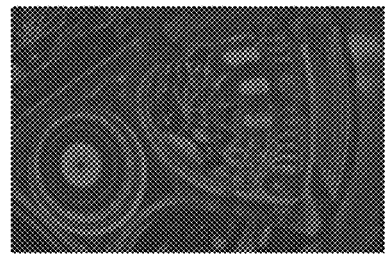
FIG. 15B is a sample image at 10 candelas per square meter.

In the brightness of a display scenario, a set of simulated displays of different maximum brightness were presumed which vary from 10 to 1000 $cd/m^2$. This is also the situation when the backlight of an LCD display is modulated. The dynamic range of the display is the same as in the previous example, i.e., 1:100. The change of the tone mapping parameters is shown in FIG. 15A with the images of the extreme cases shown in FIGS. 15B and 15C. As the display gets brighter, its effective dynamic range, as may be limited by panel reflections, gets higher and better image reproduction can be achieved. For this reason, both contrast and sharpness parameters converge toward the value of one. Note that the value of one would indicate no change of contrast and sharpness and therefore perfect reproduction.

Viewing Distance

In the viewing distance scenario, an observer is simulated as moving away from the display. This effect is illustrated in FIG. 16A by the viewing distance starting at a normalized distance of two display heights and stopping at twelve display heights. The viewing distance significantly influences the contrast sensitivity for high and low spatial frequencies as was illustrated by example in FIG. 10. At larger distances, relatively small details in the window and in the shades of FIG. 16B are no longer visible in FIG. 16C and this effect is because preserving them is no longer weighted heavily when the CSF is accommodated. Accordingly, the exemplary tone-mapping process incorporating the CSF increased contrast at large distances, thus offering better contrast reproduction at the cost of clipping the brightest and the darkest regions of the image.

System Embodiments

Figure 17:
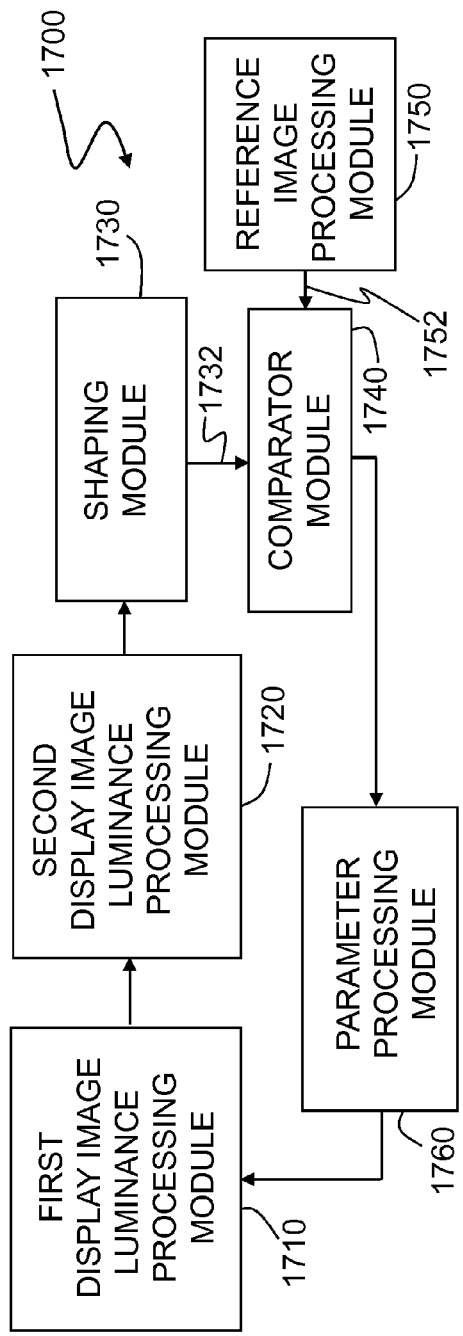
FIG. 17 is a high level functional block diagram of an exemplary system embodiment of the present invention.

An exemplary system embodiment of the present invention is illustrated in FIG. 17 where the system 1700 includes a first display image luminance processing module 1710 having a processing unit, and addressable memory, the processing module is adapted to execute computer instructions to modify a display image luminance based on an input luminance and a brightness parameter, a sharpness parameter, and a contrast parameter; a second display image luminance processing module 1720 is adapted to execute computer instructions to modify a display image luminance based on a human luminance perception model as part of the human visual system model, a shaping or filtering module 1730 adapted to execute computer instructions to shape the spatial frequency response of the modified display image with a contrast sensitivity function and adapted to generate a display response image, a comparator module 1740 adapted to execute computer instructions to generate the error value based on the generated display visual response image 1732 and a reference visual response image 1752; and a parameter processing module 1760 having a processing unit, and addressable memory adapted to modify at least one of: the brightness parameter, the sharpness parameter, the contrast parameter, and, optionally, a white light bias; wherein the parameter modification is based on the generated error value. One of ordinary skill in the art will appreciate that functionality may be distributed across or within different modules of various system embodiments and still fall within the contemplated scope of the invention. The exemplary system embodiment may also have the first display processing module 1710 having a processing unit, and addressable memory wherein the first display processing module 1710 is adapted to modify a display image chrominance based on a white light bias parameter. The first display processing module 1710 of the exemplary system embodiment may be further adapted to limit, on a pixel-by-pixel basis, when a display image color radiance component exceeds a display-limited range, then limiting, on a pixel-by-pixel basis, the display image color radiance component to the exceeded display-limited range value. The exemplary system embodiment may further include a reference visual image processing module 1750 having a processing unit, and addressable memory wherein the reference image processing module is adapted to modify a reference image luminance based on the human luminance perception model of the human visual system model and shaping or filtering the modified display image spatial frequency transform with a contrast sensitivity function and generate a reference visual response image.

Apparatus Embodiments

Figure 18:
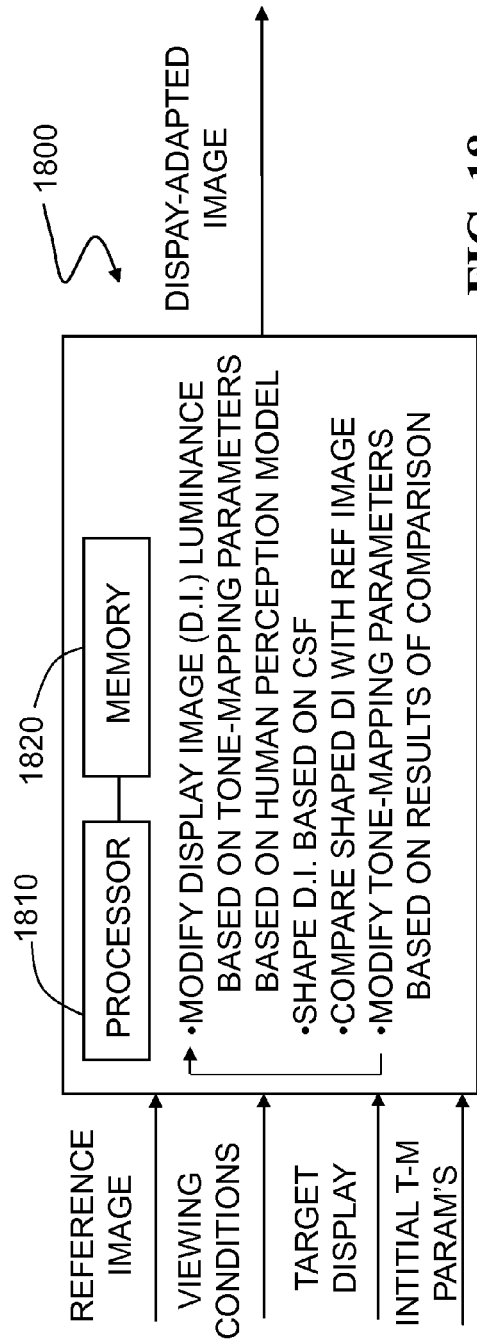
FIG. 18 is a high level functional block diagram of an apparatus embodiment of the present invention.

An exemplary apparatus embodiment of the present invention is illustrated in FIG. 18 where the apparatus 1800 includes a processing module having a processing unit 1810, and addressable memory 1820 wherein the processing module tests on whether a generated error value is less than a threshold value and wherein the processing module is adapted to execute computer instructions to: modify a display image luminance based on an input luminance and a brightness parameter, a sharpness parameter, and a contrast parameter; modify a display image luminance based on a human luminance perceptual model as part of a human visual system model; shape or filter the spatial frequency transform of the modified display image with the contrast sensitivity function and generate a display visual response image; compare the generated display visual response image with a reference visual response image to generate the error value; and modify at least one of: the brightness parameter, the sharpness parameter, the contrast parameter, and the white light bias; when the generated error value is above a threshold value. The processing module 1810 of the exemplary apparatus may be further adapted to execute computer instructions to modify a display image chrominance based on a white light bias parameter, and limit, on a pixel-by-pixel basis, when a display image color radiance component exceeds a display-limited range, then limiting, on a pixel-by-pixel basis, the display image color radiance component to the exceeded display-limited range value. The processing module 1810 of the exemplary apparatus may be further adapted to execute computer instruction to modify a reference image luminance based on the human luminance perception model as a portion of the human visual system model and shape or filter the spatial frequency transform of the modified display image with a contrast sensitivity function and generate a reference visual response image.

Although this invention has been disclosed in the context of certain embodiments and examples, it will be understood by those of ordinary skill in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of ordinary skill in the art based upon this disclosure. It is also contemplated that various combinations or subcombinations of the specific features and aspects of the embodiments may be made and still fall within the scope of the invention. The embodiments of the present invention may be embodied in a set of program instructions, e.g., software, hardware, or both—i.e., firmware. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above.

What is claimed is:

1. A method of image rendering, the method comprising: if an error value exceeds a threshold value, then iteratively performing the steps of:
    modifying a display image luminance based on an input luminance and a set of tone-mapping parameters comprising: a brightness parameter, a sharpness parameter, and a contrast parameter, wherein the modifying is based on a linear combination of a mean luminance component, a high pass luminance component, and a low pass luminance component;
    transforming the modified display image luminance based on a human luminance perception model and generating a display visual response image;
    comparing the display visual response image with a reference visual response image to generate the error value;
    modifying at least one of the set of tone-mapping parameters comprising: the brightness parameter, the sharpness parameter, and the contrast parameter; wherein the parameter modification is based on the generated error value;
    and generating a tone-mapped output luminance based on the modified input luminance and at least one of the set of the modified tone-mapping parameters.

2. The method of image rendering of claim 1 further comprising, after the step of modifying a display image luminance based on an input luminance and a brightness parameter, a sharpness parameter, and a contrast parameter, the step of modifying a display image chrominance based on a white light bias parameter, and, wherein the set of tone-mapping parameters further comprises the white light bias parameter.

3. The method of image rendering of claim 1 further comprising, after the step of modifying a display image luminance based on an input luminance and a brightness parameter, a sharpness parameter, and a contrast parameter, the step of: if, on a pixel-by-pixel basis, a display image color radiance component exceeds a display-limited range, then limiting, on a pixel-by-pixel basis, the display image color radiance component to the exceeded display-limited range value.

4. The method of image rendering of claim 1 further comprising, after the step of modifying a display image luminance based on the human luminance perception model, the step of shaping a spatial frequency transform of the modified display image with a contrast sensitivity function and thereafter generating the display visual response image.

5. The method of image rendering of claim 1 further comprising, preceding the step of testing whether the error value exceeds the threshold value, the steps of modifying the reference image luminance based on a human luminance perception model and shaping a spatial frequency transform of the modified reference image with a contrast sensitivity function and thereafter generating the reference visual response image.

6. The method of image rendering of claim 5 wherein the contrast sensitivity function is a function of viewing distance.

7. The method of claim 1 wherein the human luminance perception model comprises a just-noticeable-difference (JND) encoding function.

8. The method of claim 1 wherein the error value is a mean square error value.

9. The method of claim 1 wherein a second error value is generated for comparing with the threshold value via a determination of the maximal pixel difference between the display response image and the reference response image.

10. The method of claim 1 wherein each component is weighted by a tone-mapping parameter from the set of tone-mapping parameters.

11. The method of claim 1 wherein the high pass luminance component is determined based on the input luminance less the low pass luminance component and less the mean luminance component.

12. A method of image rendering, the method comprising:
    modifying a reference visual image luminance based on a human luminance perception model;
    shaping a spatial frequency transform of the modified reference image with a contrast sensitivity function and generating a reference visual response image;
    if an error value exceeds a threshold value, then iteratively performing the steps of:
    modifying a display image luminance based on an input luminance and a set of tone-mapping parameters comprising: a brightness parameter, a sharpness parameter, and a contrast parameter, wherein the modifying is based on a linear combination of a mean luminance component, a high pass luminance component, and a low pass luminance component;
    if, on a pixel-by-pixel basis, a display image color radiance component exceeds a display-limited range, then limiting, on a pixel-by-pixel basis, the display image color radiance component to the exceeded display-limited range value;
    transforming the modified display image luminance based on the human luminance perception model;
    shaping a spatial frequency transform of the modified display image with the contrast sensitivity function and generating a display visual response image;
    comparing the display visual response image with the reference visual response image to generate an error value;

modifying at least one of the set of tone-mapping parameters comprising: the brightness parameter, the sharpness parameter, and the contrast parameter; wherein the parameter modification is based on the generated error value; and generating a tone-mapped output luminance based on the modified input luminance and at least one of the set of the modified tone-mapping parameters.

13. The method of image rendering of claim 12 further comprising modifying a display image chrominance based on a white light bias parameter prior to limiting, on a pixel-by-pixel basis, the display image color radiance component to the exceeded display-limited range value and, wherein the set of tone-mapping parameters further comprises the white light bias parameter.

14. The method of image rendering of claim 12 wherein the contrast sensitivity function is a function of viewing distance.

15. The method of claim 12 wherein the human luminance perception model comprises a just-noticeable-difference (JND) encoding function.

16. The method of claim 12 wherein the error value is a mean square error value.

17. The method of claim 12 wherein the error value is generated via a determination of the maximal pixel difference between the display visual response image and the reference visual response image.

18. A system for image rendering comprising:
a first display image luminance processing module having a processing unit, and addressable memory, the first display image luminance processing module adapted to modify a display image luminance based on an input luminance and a set of tone-mapping parameters comprising: a brightness parameter, a sharpness parameter, and a contrast parameter, wherein the modification is based on a linear combination of a mean luminance component, a high pass luminance component, and a low pass luminance component;
a second display image luminance processing module, executable via a processing unit having addressable memory, wherein the second display image luminance module is adapted to modify a display image luminance based on a human luminance perception model;
a shaping module, executable via a processing unit having addressable memory, wherein the shaping module is adapted to shape the spatial frequency response of the modified display image with a contrast sensitivity function and adapted to generate a display visual response image;
a comparator module, executable via a processing unit having addressable memory, wherein the comparator module is adapted to generate an error value based on the generated display visual response image and a reference visual response image; and
a parameter processing module, executable via a processing unit having addressable memory, wherein the parameter processing module is adapted to modify at least one of the set of tone-mapping parameters comprising: the brightness parameter, the sharpness parameter, and the contrast parameter; wherein the parameter modification is based on the generated error value.

19. The system of claim 18 further comprising a display processing module, executable via a processing unit having addressable memory, wherein the display processing module is adapted to modify a display image chrominance based on a white light bias parameter; and, wherein the set of tone-mapping parameters further comprises the white light bias parameter.

20. The system of claim 19 wherein the display processing module is further adapted to limit, on a pixel-by-pixel basis, when a display image color radiance component exceeds a display-limited range, then limiting, on a pixel-by-pixel basis, the display image color radiance component to the exceeded display-limited range value.

21. The system of claim 18 further comprising a reference image processing module, executable via a processing unit having addressable memory, wherein the reference image processing module is adapted to modify a reference image luminance based on a human luminance perception model and shaping the spatial frequency transform of the modified reference image with a contrast sensitivity function and generate a reference response image.

22. The system of claim 18 wherein the first display image luminance processing module is further adapted to modify a reference image luminance based on a human luminance perception model and shaping the spatial frequency transform of the modified reference image with a contrast sensitivity function and generate a reference response image.

23. An apparatus for image rendering comprising:
a processing module having a processing unit, and addressable memory wherein the processing module is adapted to execute the following steps while an error value is above a threshold value:
modify a display image luminance based on an input luminance and a set of tone-mapping parameters comprising: a brightness parameter, a sharpness parameter, and a contrast parameter, wherein the modification is based on a linear combination of a mean luminance component, a high pass luminance component, and a low pass luminance component;
modify a display image luminance based on a human luminance perception model;
shape the modified display image spatial frequency transform with a contrast sensitivity function and generate a display visual response image;
compare the generated display visual response image with a reference visual response image to generate the error value;
modify at least one of the set of tone-mapping parameters comprising: the brightness parameter, the sharpness parameter, the contrast parameter; wherein the parameter modification is based on the generated error value; and
generate a tone-mapped output luminance based on the modified input luminance and at least one of the set of the modified tone-mapping parameters.

24. The apparatus for image rendering of claim 23 wherein the processing module is further adapted to modify a display image chrominance based on a white light bias parameter, and limit, on a pixel-by-pixel basis, when a display image color radiance component exceeds a display-limited range, then limiting, on a pixel-by-pixel basis, the display image color radiance component to the exceeded display-limited range value and, wherein the set of tone-mapping parameters further comprises the white light bias parameter.

25. The apparatus for image rendering of claim 24 wherein the processing module is further adapted to modify a reference image luminance based on a human luminance perception model and shape a spatial frequency transform of the modified reference image with a contrast sensitivity function and thereafter generate the reference visual response image.

* * * * *